United States Patent
Pai et al.

(10) Patent No.: US 10,664,294 B2
(45) Date of Patent: May 26, 2020

(54) MATCHING ADOPTING USERS AND CONTRIBUTING USERS FOR DECENTRALIZED SOFTWARE LOCALIZATION

(71) Applicants: Yogish Pai, Los Gatos, CA (US); Steve George Goyette, Mountain View, CA (US); Robert Bruce MacMartin, Mountain View, CA (US); Bharath Kadaba, San Francisco, CA (US); Narayana Hari, Dublin, CA (US); Jayanth Saimani, Bangalore (IN); Anshu Verma, Bangalore (IN); Anil Sharma, Bangalore (IN); Kiran Aswath, Bangalore (IN); Merrin Kurian, Bangalore (IN)

(72) Inventors: Yogish Pai, Los Gatos, CA (US); Steve George Goyette, Mountain View, CA (US); Robert Bruce MacMartin, Mountain View, CA (US); Bharath Kadaba, San Francisco, CA (US); Narayana Hari, Dublin, CA (US); Jayanth Saimani, Bangalore (IN); Anshu Verma, Bangalore (IN); Anil Sharma, Bangalore (IN); Kiran Aswath, Bangalore (IN); Merrin Kurian, Bangalore (IN)

(73) Assignee: Intuit Inc., Mountain View, CA (US)

( * ) Notice: Subject to any disclaimer, the term of this patent is extended or adjusted under 35 U.S.C. 154(b) by 98 days.

(21) Appl. No.: 15/908,409

(22) Filed: Feb. 28, 2018

(65) Prior Publication Data
US 2019/0265992 A1    Aug. 29, 2019

(51) Int. Cl.
*G06F 9/44* (2018.01)
*G06F 9/451* (2018.01)
(Continued)

(52) U.S. Cl.
CPC .......... *G06F 9/454* (2018.02); *G06F 9/44505* (2013.01); *G06F 16/9024* (2019.01); *G06Q 40/12* (2013.12)

(58) Field of Classification Search
CPC .................................................... G06F 8/00–36
(Continued)

(56) References Cited

U.S. PATENT DOCUMENTS

| | | | | |
|---|---|---|---|---|
| 7,546,576 B2 * | 6/2009 | Egli | ........................ | H04L 29/06 715/239 |
| 7,584,451 B2 * | 9/2009 | Iborra | ....................... | G06F 8/30 717/101 |

(Continued)

OTHER PUBLICATIONS

"Internationalization and Localization of Software"—Steffen Gross; A Review Paper Submitted to the Eastern Michigan University Department of Computer Science—Jun. 19, 2006.*

*Primary Examiner* — Francisco J Aponte
(74) *Attorney, Agent, or Firm* — Ferguson Braswell Fraser Kubasta PC

(57) ABSTRACT

A method to configure a software solution may include receiving a first specification of a type of configuration data items and a second specification of system selected user attributes associated with the type of configuration data items, and receiving a configuration data item that is used to configure a first localized version of the software solution. The method may further include receiving a contributing user attribute specification that specifies a first user attribute and a second user attribute of the system selected user attributes, and generating a search tag assigned to the configuration data item. The method may further include receiving a search request to search the configuration data items, selecting, in response to the search request, the configuration data item based on the search tag, and configuring, in response to selecting the configuration data item, (Continued)

a second localized version of the software solution based on the configuration data item.

17 Claims, 8 Drawing Sheets

(51) Int. Cl.
    *G06Q 40/00*          (2012.01)
    *G06F 9/445*          (2018.01)
    *G06F 16/901*        (2019.01)

(58) Field of Classification Search
    USPC .......................................................... 717/107
    See application file for complete search history.

(56) References Cited

U.S. PATENT DOCUMENTS

| | | | | |
|---|---|---|---|---|
| 7,774,289 B2* | 8/2010 | Aniszczyk | ............... | G06F 8/61 706/45 |
| 7,797,678 B2* | 9/2010 | Moulckers | ............... | G06F 8/34 705/54 |
| 8,015,546 B2* | 9/2011 | Jones | ............... | G06F 8/34 717/109 |
| 8,386,653 B2* | 2/2013 | Wright | ............... | G06F 15/177 710/10 |
| 8,417,715 B1* | 4/2013 | Bruckhaus | ............ | G06Q 10/04 707/758 |
| 8,904,344 B2* | 12/2014 | Hoff | ............... | G06F 8/61 717/104 |
| 9,075,959 B2* | 7/2015 | Chouinard | ............... | G06F 21/10 |
| 9,959,560 B1* | 5/2018 | Whitaker | ............ | G06Q 30/0625 |
| 10,235,721 B1* | 3/2019 | Cabrera | ............... | G06Q 40/123 |
| 10,275,440 B2* | 4/2019 | Srinivasan | ............ | G06F 17/245 |
| 10,289,285 B2* | 5/2019 | Pai | ............... | G06F 3/04842 |
| 10,339,029 B2* | 7/2019 | Rameshwar | ........ | G06F 11/3604 |
| 10,387,787 B1* | 8/2019 | Cessna | | |
| 2004/0019540 A1* | 1/2004 | William | ............... | G06Q 10/10 705/31 |
| 2004/0019541 A1* | 1/2004 | William | ............... | G06Q 10/10 705/31 |
| 2005/0204332 A1* | 9/2005 | Krishnan | ............... | G06F 9/454 717/102 |
| 2006/0155618 A1* | 7/2006 | Wyle | ............... | G06F 17/243 705/31 |
| 2006/0167577 A1* | 7/2006 | Clark | ............... | G06F 8/71 700/97 |
| 2007/0094641 A1* | 4/2007 | Darr | ............... | G06F 8/10 717/121 |
| 2008/0015911 A1* | 1/2008 | Wang | ............... | G06F 8/10 717/102 |
| 2009/0210853 A1* | 8/2009 | Kumar | ............... | G06F 8/10 717/101 |
| 2011/0144972 A1* | 6/2011 | Koenig | ............... | G06F 17/2725 704/2 |
| 2011/0191215 A1* | 8/2011 | Nadler | ............... | G06Q 20/207 705/31 |
| 2012/0079477 A1* | 3/2012 | Boss | ............... | G06F 8/61 717/178 |
| 2012/0102451 A1* | 4/2012 | Kulkarni | ............... | G06F 8/24 717/102 |
| 2012/0179987 A1* | 7/2012 | Mohan | ............... | G06F 8/38 715/762 |
| 2012/0185821 A1* | 7/2012 | Yaseen | ............... | G06F 8/10 717/105 |
| 2012/0191580 A1* | 7/2012 | Bhatt | ............... | G06Q 40/12 705/30 |
| 2013/0067435 A1* | 3/2013 | Huang | ............... | G06F 8/33 717/121 |
| 2013/0339870 A1* | 12/2013 | Tandra Sishtla | .... | G06F 17/2836 715/744 |
| 2014/0114822 A1* | 4/2014 | Sharma | ............... | G06Q 40/12 705/31 |
| 2014/0143750 A1* | 5/2014 | Gangadharan | ............ | G06F 8/10 717/102 |
| 2014/0201045 A1* | 7/2014 | Pai | ............... | G06Q 40/123 705/31 |
| 2014/0214637 A1* | 7/2014 | Pai | ............... | G06Q 40/123 705/31 |
| 2014/0372980 A1* | 12/2014 | Verma | ............... | G06F 9/4451 717/121 |
| 2015/0074642 A1* | 3/2015 | Weatherhead | ............ | G06F 8/24 717/121 |
| 2015/0221043 A1* | 8/2015 | Chithambaram | ...... | G06Q 40/12 715/703 |
| 2015/0242205 A1* | 8/2015 | Kaneko | ............... | G06F 8/71 717/122 |
| 2016/0275299 A1* | 9/2016 | Srinivasan | ............... | H04W 4/21 |
| 2017/0032468 A1* | 2/2017 | Wang | ............... | G06Q 40/123 |
| 2017/0235848 A1* | 8/2017 | Van Dusen | ............ | H04L 41/04 705/12 |
| 2019/0052549 A1* | 2/2019 | Duggal | ............... | H04L 41/5045 |
| 2019/0265971 A1* | 8/2019 | Behzadi | ............... | G06F 8/77 |

* cited by examiner

MATCHING ADOPTING USERS AND CONTRIBUTING USERS FOR DECENTRALIZED SOFTWARE LOCALIZATION

BACKGROUND

Local regulations and/or norms exist throughout various geographical or jurisdictional regions for conducting business. A product marketed or used in each region needs to comply and/or support the local regulation/norm to be competitive. Similarly, different types of users of a product may have different requirements for various aspects of the product. A product targeting multiple types of users needs to support varying requirements of different types of users to be competitive. Internet-based promotion and distribution have accelerated and broadened market reach of products to global customers. Customizing a product to support a wide range of regional requirements and satisfy vastly different types of users reachable via the Internet is a time-consuming task. Techniques for customizing a product prior to the Internet era are not scalable to meet the challenges created by the Internet-based promotion and distribution. Without overcoming these challenges, a global product targeting a vast number of different types of users across international regions cannot compete with a local product focusing on a single type of users.

A secular shift to the adoption of cloud-based computing is in progress worldwide in the small business space. Typically, a globally-scaled software solution includes a cloud-based financial management solution for small businesses across the world. Examples may include a product that speaks the local language, is compliant to the local norms and regulations, and greatly simplifies worldwide users' bookkeeping and accounting responsibilities while allowing the owners to focus on running the business and serving customers.

The market opportunity provided by the secular shift to cloud computing is a massive one. A software provider in the domestic market may become the same trusted brand to small businesses worldwide, including developed economies such as those of the European Union, as well as rapidly emerging economies such as Brazil and India. To accomplish such a task, a platform is necessary that allows the software provider to enter new markets quickly, with low cost and high quality, as well as to stay compliant in these markets in real time after entry. The platform should allow the software provider to overcome barriers encountered by prior art approaches such as: (i) requirements gathering, product design and implementation based on one-market-at-a-time, (ii) monolithic, inflexible, non-extensible, everything-in-code implementation approach, and (iii) centralized, serialized market prioritization and execution.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a system to configure a software solution including a computer server hosting the software solution and including a configuration engine configured to receive a first specification of a type of configuration data items and a second specification of system selected user attributes associated with the type of configuration data items, configure a first localized version of the software solution for a contributing user based on a configuration data item of the type, generate a search tag assigned to the configuration data item of the type, select, in response to a search request, the configuration data item of the type based on the search tag, and configure, in response to selecting the configuration data item of the type, a second localized version of the software solution based on the configuration data item of the type. The system further includes a repository configured to store configuration data items of the type that includes the configuration data item of the type. The configuration data items of the type are received from contributing users that include the contributing user. The system further includes a contributing user computer configured to receive, from the contributing user, the configuration data item of the type for sending to the configuration engine, access the first localized version of the software solution via a computer network to perform a pre-determined task of the contributing user in compliance with a first local requirement of the contributing user, and further receive, from the contributing user, a contributing user attribute specification that specifies a first user attribute and a second user attribute of the system selected user attributes. The search tag is assigned to the configuration data item of the type in response to receiving the contributing user attribute specification. The search tag includes a first contributing user attribute value of the first user attribute and a second contributing user attribute value of the second user attribute for the contributing user. The system further includes an adopting user computer configured to receive, from an adopting user, the search request for sending to the configuration engine to search the type of configuration data items, and access the second localized version of the software solution via the computer network to perform the pre-determined task of the adopting user in compliance with a second local requirement of the contributing user. The computer network is configured to couple the computer server, the contributing user computer, and the adopting user computer.

In general, in one aspect, one or more embodiments relate to a method to configure a software solution including receiving, at a computer server hosting the software solution, a first specification of a type of configuration data items and a second specification of system selected user attributes associated with the type of configuration data items, and receiving, from a contributing user, a configuration data item of the type that is used by the computer server to configure a first localized version of the software solution. The first localized version is accessed by the contributing user to perform a pre-determined task in compliance with a first local requirement of the contributing user. The method further includes receiving, from the contributing user, a contributing user attribute specification that specifies a first user attribute and a second user attribute of the system selected user attributes, and generating, in response to receiving the contributing user attribute specification, a search tag assigned to the configuration data item of the type. The search tag includes a first contributing user attribute value of the first user attribute and a second contributing user attribute value of the second user attribute for the contributing user. The method further includes receiving, from an adopting user, a search request to search the type of configuration data items, selecting, in response to the search request, the configuration data item of the type based on the search tag, and configuring, by the computer server in response to selecting the configuration data item of the type, a second localized version of the software solution based on the configuration data item of the type. The second localized version is accessed by the adopting user to perform the pre-determined task in compliance with a second local requirement of the adopting user.

In general, in one aspect, one or more embodiments relate to a non-transitory computer readable medium storing instructions to configure a software solution. The instructions, when executed by a computer processor, include functionality for receiving, at a computer server hosting the software solution, a first specification of a type of configuration data items and a second specification of system selected user attributes associated with the type of configuration data items, and receiving, from a contributing user, a configuration data item of the type that is used by the computer server to configure a first localized version of the software solution. The first localized version is accessed by the contributing user to perform a pre-determined task in compliance with a first local requirement of the contributing user. The method further includes receiving, from the contributing user, a contributing user attribute specification that specifies a first user attribute and a second user attribute of the system selected user attributes, and generating, in response to receiving the contributing user attribute specification, a search tag assigned to the configuration data item of the type. The search tag includes a first contributing user attribute value of the first user attribute and a second contributing user attribute value of the second user attribute for the contributing user. The method further includes receiving, from an adopting user, a search request to search the type of configuration data items, selecting, in response to the search request, the configuration data item of the type based on the search tag, and configuring, by the computer server in response to selecting the configuration data item of the type, a second localized version of the software solution based on the configuration data item of the type. The second localized version is accessed by the adopting user to perform the pre-determined task in compliance with a second local requirement of the adopting user.

Other aspects of the invention will be apparent from the following detailed description and the appended claims.

DETAILED DESCRIPTION

Figure 1A:
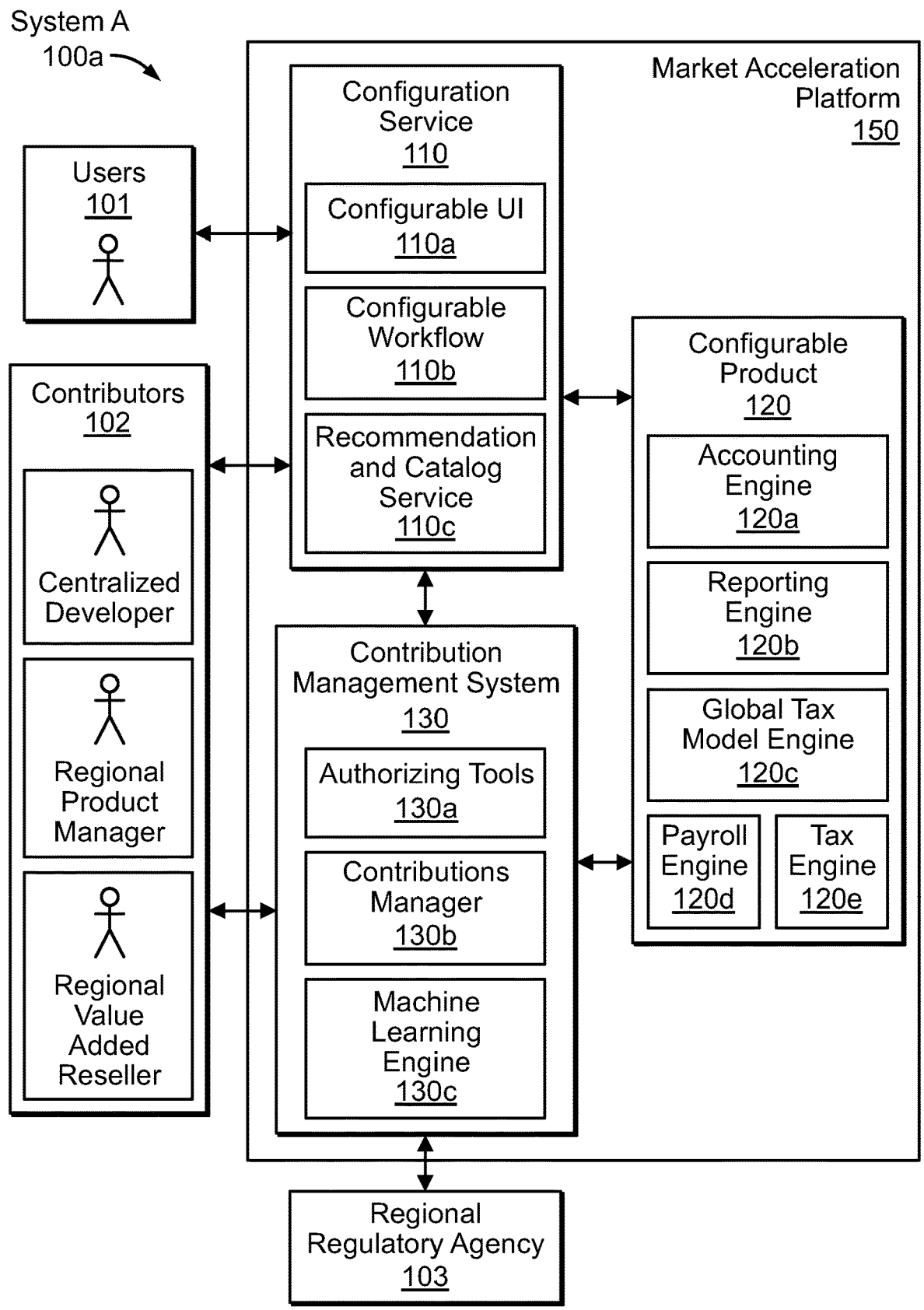
FIG. 1A shows a schematic diagram of a system for globally scalable software in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout this disclosure, the terms "internationalization" and "localization" refer to adapting computer software to different languages, regional differences, and regulatory requirements of a target market, such as a geographical or jurisdictional region. Internationalization is the process of designing a software solution so that the application can be adapted to various regional requirements without substantial engineering changes. Localization is the process of adapting internationalized software for a specific region by adding locale-specific components and translating text based on a language specific to the region. Throughout this disclosure, the term "geographic region" refers to a region with a set of regulatory requirements/laws under the control of a system of courts or government entity which are different from neighboring regions. Generally, the regulatory requirements are imposed on local business entities to report various regulated aspects of their business activities on a periodic basis. For example, a tax jurisdiction corresponds to a region where the regulatory requirements include a set of tax laws under the control of local government entities.

In one or more embodiments of the invention, the terms "internationalization" and "localization" are collectively referred to as "scaling" a software solution. Aspects of this disclosure focus on the global scaling of a software solution designed and provided centrally by the software provider. In one or more embodiments, scaling may also refer to adapting a hardware product to different languages, regional differences, and regulatory requirements of a target market, such as a geographical or jurisdictional region.

In one or more embodiments of the invention, a system and method are based on or associated with a Market Acceleration Platform (MAP). The MAP solves the issues of these prior art approaches by (i) performing market requirements analysis in the large to scout groups of related markets together (e.g., commonwealth countries, countries of the EU, Latin America), which unearths common themes in product requirements, and (ii) taking a metadata-driven, configurable approach to product development that leverages the common themes in product requirements to maximize code re-use through configuration, enables product extensibility to create user-level configuration and facilitates product enrichment/refinement by a worldwide network of third-party developers, local market experts (e.g., local accountants), and small business end users. In other words, with the gain in speed and flexibility in product development, the MAP allows the software provider to explore decentralized, parallelized go-to-market strategies.

The key principles that guide the technology and architecture of the MAP include the following:

a. designing the platform components that enable configurability to be domain-agnostic and re-usable across in-house developers of the software provider;
b. developing the platform components in a just-in-time fashion staying in tune with the needs of the products/offerings;
c. developing domain specific capabilities in a manner that is configurable;
d. defining the configuration metadata language/syntax in a manner that is coherent, specific where needed, and extensible where appropriate;
e. designing for enterprise-to-enterprise (E2E) performance such that the offerings are configurable and metadata driven with consideration for performance impact and appropriate measures of near-caching and far-caching strategies;
f. progressively investing in authoring tools that allow non-engineers to specify software configurations; and
g. allowing incremental support of a newly identified local requirement to be configurable at runtime to the extent possible, and not depend on formal software release cycles.

As to be expected, there are significant differences (i.e., variances) in terms of what the scalable software product needs to support in each market to be competitive. At a high-level, from the ecosystem perspective, the aspects that exhibit the most variance include bank feeds, data-in/data-out variability (import/export), billing, payments, and compliance variance in local accounting and payroll. In summary, the MAP focuses on clearly identifying and delineating the areas of variance, solidifying the non-varying core, and providing an architecture that exploits the commonality across markets while allowing the software product to be configured and extended to implement the variances.

Embodiments of the invention provide a method, system, and computer readable medium for customizing a product based on user contributions. In one or more embodiments of the invention, a customizable component of the product is configured for a user based on customization of the product made by similar users, i.e., users within a similar region and/or having a similar business requirement. In an example of a software product, the customizable component of the product may correspond to a user interface, a business workflow, a tax structure and/or a report layout of an internationalized online financial solution, each or a portion of which is configured in the localization process to comply with jurisdictional requirements of a geographic region.

In one or more embodiments of the invention, the aforementioned user contributions include configuration data items generated and submitted by contributing users to configure a software solution based on local requirements of the contributing users. The configuration data items are indexed based on contributing users' attributes and cataloged in a graph database. The graph database is a database that uses graph structures for semantic queries where nodes, links, and properties are used to represent and store data. Accordingly, the graph structure is used to select (e.g., match) a configuration data item in response to a query from an adopting user. The selected configuration data item is then used to configure the software solution for the adopting user (importantly) without requiring the adopting user to generate any additional configuration data item.

FIG. 1A depicts a schematic block diagram of a system A (100a) in accordance with one or more embodiments of the invention. In embodiments of the invention, one or more of the modules and elements shown in FIG. 1A may be omitted, repeated, and/or substituted. Accordingly, embodiments of the invention should not be considered limited to the specific arrangements of modules shown in FIG. 1A.

As shown in FIG. 1A, the system A (100a) includes a configuration service (110), a configurable product (120), a contribution management system (130), a regional regulatory agency (103), users (101), and contributors (102). In one or more embodiments of the invention, various components of the system A (100a) are coupled via a computer network (not shown). For example, the computer network may include wired and/or wireless portions of a public and/or private data network, such as wide area networks (WANs), local area networks (LANs), Internet, etc. In one or more embodiments of the invention, various components of the system A (100a) collectively form a Market Acceleration Platform (MAP) (150). Each of these components is described below.

In one or more embodiments of the invention, the MAP (150) includes hardware and software components for executing the configuration service (110), configurable product (120), and contribution management system (130). In one or more embodiments, the MAP (150) includes a web-based solution such that the users (101) and contributors (102) interact with the MAP (150) using web browsers on respective user devices (e.g., computing and communication devices). In one or more embodiments, the computing and communication devices may include a desktop computer, notebook computer, tablet computer, or other suitable mobile computing devices such as a smartphone. In one or more embodiments, a copy of at least a portion of the MAP (150) is downloaded onto user devices where the users (101) and contributors (102) interact with the downloaded copy via a user interface (UI) menu displayed on the user device.

In one or more embodiments of the invention, the configurable product (120) may be a software solution, such as an accounting software, a financial software, a web service, or any other solution. In one or more embodiments of the invention, the configurable product (120) includes one or more configurable engines, such as an accounting engine (120a), a reporting engine (120b), a global tax model engine (120c), a payroll engine (120d), and a tax engine (120e) that perform various functions of the configurable product (120). In this context, these configurable engines are also referred to as functional engines of the configurable product (120). In one or more embodiments, these configurable engines include customizable components, such as a tax structure, a report layout, a calculation formula, or any other jurisdiction/region dependent component.

In one or more embodiments, the customizable components are customized by the users (101) and/or contributors (102) to configure a customized copy of the configurable product (120) for performing a pre-determined task. For example, the pre-determined task may include generating a sales or purchase document (e.g., invoice, purchase order, sales order, receipt, payment request, etc.), preparing a tax agency filing (e.g., income tax filing, sales tax filing, etc.), preparing an accounting report (e.g., proposal, quotation, billing statement, payable report, expense report, etc.), etc. according to tax jurisdiction or other regulatory requirements of a particular geographical region. For example, the customizable component may be a tax structure and performing the pre-determined task within the geographical region may include at least calculating a tax amount based on a customizable tax rate in the tax structure.

Continuing with FIG. 1A, in one or more embodiments of the invention, the users (101) are individuals or business entities who use the configurable product (120). In addition, the contributors (102) are individuals or business entities who contribute to localization or other customization of the configurable product (120). Some of the users (101) and contributors (102) may be members of a user community. The user community may be, for example, a group of accountants working in a particular geographical region who jointly contribute to localization of the configurable product (120) such that the resultant localized version of the configurable product (120) is shared within the user community. Other examples of the contributors (102) include an engineer (referred to as centralized developer), a regional product manager, and/or a regional value added reseller of the software provider providing the configurable product (120).

In one or more embodiments, a single configurable product (120) is localized into multiple local versions each applicable to one of many geographical regions worldwide. In particular, each local version is localized from the single configurable product (120) based on contributions from multiple regional product managers, multiple regional value added resellers, and/or other multiple contributing users located in the corresponding geographical region. In this context, each corresponding geographical region is referred to as a local market among a large number of local markets of the configurable product (120) throughout the world.

In one or more embodiments of the invention, the users (101) and contributors (102) are equipped with computing and communication devices (not shown) for interacting with the MAP (150). For example, the contributors (102) may use the computing and communication devices to submit explicit contributions to the MAP (150) for localization of the configurable product (120). In one or more embodiments, the users (101) use the computing and communication devices to access the MAP (150) and manually customize the configurable product (120). Information regarding such manual customization may be captured by the MAP (150) as implicit contributions for localization of the configurable product (120).

In one or more embodiments of the invention, the configuration service (110) includes configurable user interfaces (UIs) (e.g., configurable UI (110*a*)), configurable workflows (e.g., configurable workflow (110*b*)), and a recommendation and catalog service (110*c*). In one or more embodiments, the configuration service (110), more specifically the recommendation and catalog service (110*c*), is configured to organize a set of configurable UIs and a set of configurable workflows that are indexed, or otherwise cataloged, based on user attributes. In one or more embodiments, the configurable UI (110*a*) is a graphical user interface for the user to interact with the configurable product (120). In one or more embodiments, the configurable workflow (110*b*) is a sequence of actions undertaken by the configurable product (120) according to business logic to perform the aforementioned pre-determined task. Additional details of the configuration service (110), more specifically the recommendation and catalog service (110*c*), are described in reference to FIG. 1B below.

Continuing with FIG. 1A, in one or more embodiments, the user attributes include a geographical region, a business characteristic, or other aspects of each of the users (101). In one or more embodiments, the configuration service (110), more specifically the recommendation and catalog service (110*c*), is configured to select, based on a user attribute of a user, the configurable UI (110*a*) from a set of configurable user interfaces of the configurable product (120). In one or more embodiments, the configuration service (110), more specifically the recommendation and catalog service (110*c*), is configured to select, based on a user attribute of a user, a configurable workflow (110*b*) from a set of configurable workflows of the configurable product (120). In one or more embodiments, the set of configurable user interfaces and the set of configurable workflows of the configurable product (120) are stored in a data repository (not shown) of the MAP (150). In one or more embodiments, the data repository may include a disk drive storage device, a semiconductor storage device, a database management system, other suitable computer data storage device, or combinations thereof. In one or more embodiments, content stored in the data repository may be a data file, a linked list, a data sequence, a database, a graphical representation, or any other suitable data structure. In one or more embodiments of the invention, the data repository includes functionality to store data for the MAP (150). In one or more embodiments, the aforementioned set of configurable UIs, configurable workflows, and other configuration parameters are stored, as configuration data items that are retrievable based on the user attributes, in a graph database in the data repository of the MAP (150).

In one or more embodiments, the user attribute includes a geographical region of the user. In such embodiments, the configurable UI (110*a*) and the configurable workflow (110*b*) are defined based on at least a compliance requirement of the geographical region. In one or more embodiments, the user attribute includes a business characteristic of the user. In such embodiments, the configurable UI (110*a*) and the configurable workflow (110*b*) are defined based on the business characteristic of the user.

In one or more embodiments of the invention, the configurable product (120) performs the aforementioned pre-determined task of the user by first configuring one or more configurable engines based on the user attribute of the user. Subsequent to configuring the configurable engines, the configurable product (120) performs the pre-determined task by receiving one or more user inputs via the selected configurable UI (110*a*) and executing one or more configurable engines based on the received user inputs according to the selected configurable workflow (110*b*).

Continuing with FIG. 1A, in one or more embodiments of the invention, the contribution management system (130) includes authoring tools (130*a*), a contributions manager (130*b*), and a machine learning engine (130*c*). Each of these elements is described below.

In one or more embodiments, the authoring tools (130*a*) are configured to obtain, from a contributing user (e.g., one of the contributors (102)), a suggestion to customize the configurable product (120). In particular, the suggestion is based on a business requirement specific to the user attribute of a user. In one or more embodiments, the contributing user shares the same user attribute of the user and possesses expertise with respect to the business requirement specific to the user attribute. In one or more embodiments, the contributing user has different user attributes than the user but still possesses expertise with respect to the business requirement specific to the user attribute. In one or more embodiments, the contributing user provides the suggestion based on a request from the MAP (150). In this context, the suggestion is referred to as an explicit contribution.

In one or more embodiments, the contributions manager (130*b*) is configured to obtain, from a moderator user (e.g., one of the contributors (102)) and in response to the moderator user reviewing the business requirement specific to the user attribute of the user, a moderator input regarding the suggestion. Accordingly, the contributions manager (130*b*) generates one or more configurable UIs, one or more configurable workflows, and/or one or more configuration parameters based at least on the suggestion and the moderator input. For example, the suggestion may explicitly specify an element of the configurable UI (110a), a step or sequence of the configurable workflow (110b), and/or one or more configuration parameters. In addition, the moderator input includes an approval of the specified UI element, workflow step/sequence, and/or configuration parameter. In one or more embodiments, the configuration parameters are data items used to customize one or more of the functional engines of the configurable product (120). In this context, the configuration parameters are referred to as metadata for customizing the functional engines of the configurable product (120). Examples of the configuration parameters are described in reference to FIG. 3A and FIG. 3B below.

Continuing with FIG. 1A, in one or more embodiments, the contributions manager (130b) generates the configurable UIs, configurable workflows, and/or configuration parameters using the machine learning engine (130c). In one or more embodiments, the machine learning engine (130c) is configured to generate a statistical measure of the users (101) by tracking/monitoring/analyzing (i.e., "learning") the behavior of how the users (101) use the configurable product (120). Specifically, the statistical measure represents a statistical behavior of the users (101) using the set of configurable UIs, the set of configurable workflows, and the configuration parameters of the configurable product (120) to perform the aforementioned pre-determined task. In this context, the users (101) are said to provide implicit contributions for localizing/customizing the configurable product (120) during the course of using the configurable product (120). For example, the statistical measure may include a statistical distribution of user selections among the configurable UIs, configurable workflows, and configuration parameters. In addition, the statistical measure may further include a correlation between the statistical distribution and user attributes of the users (101).

In one or more embodiments, the machine learning engine (130c) is further configured to verify the set of configurable UIs, the set of configurable workflows, and the set of configuration parameters based on the statistical measure. For example, each configurable UI, configurable workflow, and/or configuration parameter may correspond to a correlation between user attributes and selections among the configurable UIs, configurable workflows, and configuration parameters.

In summary, the contribution management system (130) verifies the set of configurable user interfaces, the set of configurable workflows, and the set of configuration parameters using a machine learning algorithm that is based on at least the user attributes of the users (101) and the contributing user attributes of the contributors (102) who submitted corresponding implicit and explicit contributions. Accordingly, the configuration service (110) may select, as a recommendation to a user, the configurable UI (110a), the configurable workflow (110b), and other corresponding configuration parameters that are organized/indexed in the aforementioned data repository of the MAP (150) by matching the user to the user attributes and contributing user attributes who have contributed the implicit and explicit contributions.

In one or more embodiments, the contributions manager (130b) is further configured to obtain the aforementioned compliance requirement from a regional regulatory agency (103) or other third party in the geographical region.

Figure 1B:
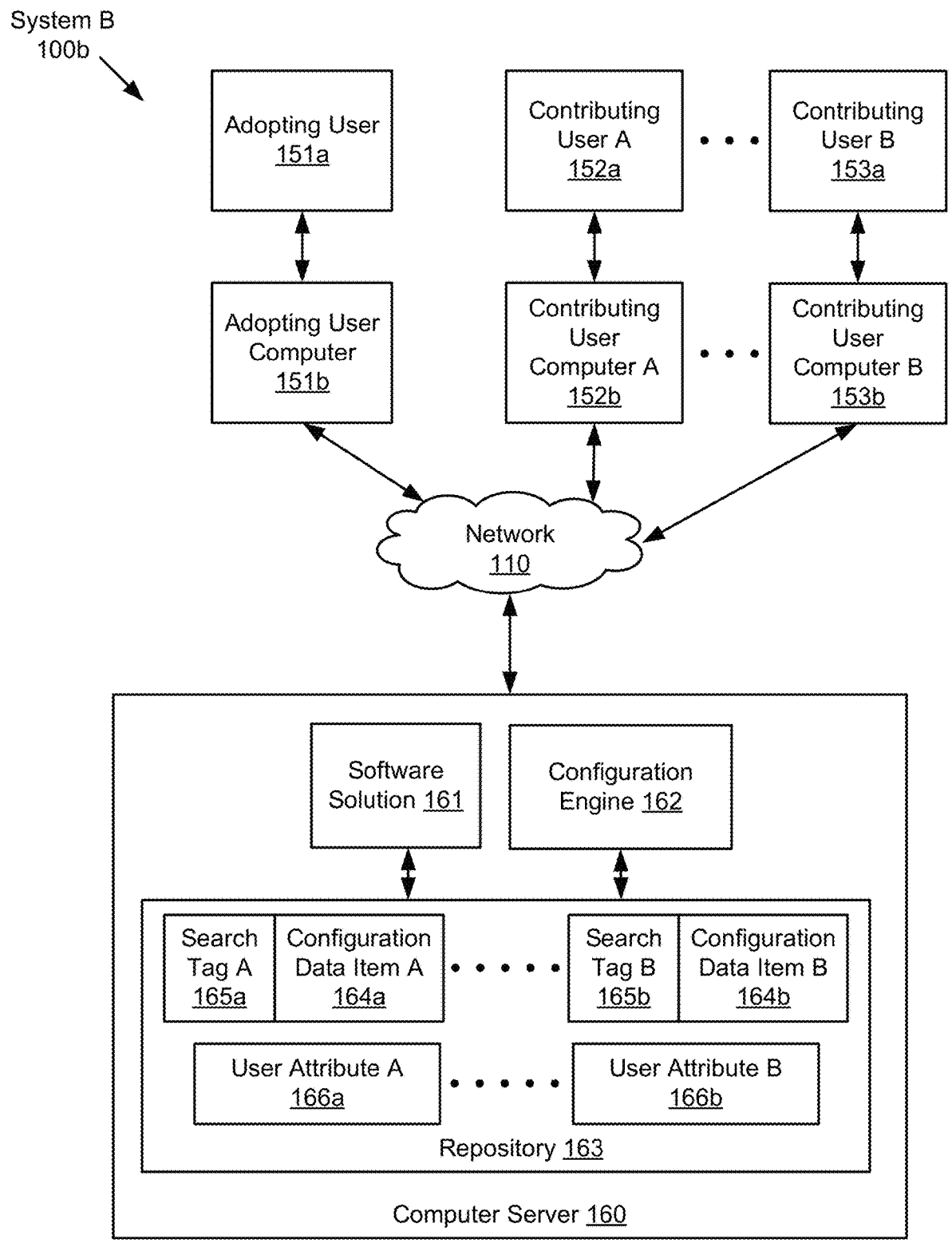
FIG. 1B shows a schematic diagram of a system for matching adopting users and contributing users for decentralized software localization in accordance with one or more embodiments of the invention.

FIG. 1B shows a block diagram of a system B (100b) in accordance with one or more embodiments of the invention. In particular, FIG. 1B shows an implementation of the MAP (150) depicted in FIG. 1A above. Specifically, the system B (100b) includes users (e.g., adopting user (151a), contributing user A (152a), contributing user B (153a), etc.), users' computing devices (e.g., adopting user computer (151b), contributing user computer A (152b), contributing user computer B (153b), etc.), and a computer server (160) that are coupled via a network (110). The computer server (160) includes a software solution (161), a configuration engine (162), and a repository (163). In one or more embodiments of the invention, the network (110) may include a cellular phone network, a wide area network, a local area network, a public switched telephone network (PSTN), a financial network, any other suitable network that facilitates the exchange of information from one part of the network to another, or a combination thereof. In one or more embodiments, the network (110) is coupled to or overlaps with the Internet. In one or more embodiments of the invention, one or more of the modules and elements shown in FIG. 1B may be omitted, repeated, and/or substituted. Accordingly, embodiments of the invention should not be considered limited to the specific arrangements of modules shown in FIG. 1B.

In one or more embodiments of the invention, the software solution (161) is essentially the same as the configurable product (120) depicted in FIG. 1A above. For example, the software solution (161) may be an accounting software, a financial software, a business tax preparation application, a web service, other types of business financial management application, or any other solution Similar to the configurable product (120) depicted in FIG. 1A, the software solution (161) may include an accounting engine, reporting engine, global tax model engine, payroll engine, and tax engine, etc. In one or more embodiments, the software solution (161) is provided by an application service provider, such as a software as a service (SaaS). For example, the software solution (161) may be operated by an application service provider (ASP) operating the computer server (160) and accessed by the user (101) on a subscription basis. In one or more embodiments of the invention, the configuration engine (162) corresponds to a portion of the configuration service (110) and contribution management system (130) depicted in FIG. 1A above. For example, the configuration engine (162) may include the functionality of the authoring tools (130a) and the recommendation and catalog service (110c) described in reference to FIG. 1A above.

In one or more embodiments of the invention, the repository (163) is configured to store data used and/or generated by the software solution (141) and the configuration engine (162). In one or more embodiments, the data stored in the repository (163) includes configuration data items (e.g., configuration data item A (164a), configuration data item B (164b), etc.) and user attributes (e.g., user attribute A (166a), user attribute B (166b), etc.). In one or more embodiments, the configuration data items and user attributes may be organized as a data file, a linked list, a data sequence, a database, a graphical representation, or any other suitable data structure. In one or more embodiments, the configuration data items and user attributes are stored in a graph database in the repository (163). An example of organizing the configuration data items and user attributes in a graph database is described in reference to FIG. 3C below.

In one or more embodiments, a user attribute (e.g., user attribute A (166a), user attribute B (166b), etc.) includes the geographical location and one or more business characteristics of a user (e.g., adopting user (151a), contributing user A (152a), contributing user B (153a), etc.). For example, the user attribute may include a country, city, district, etc. where the user resides or operates a business as well as an industry, business size, business category, language, and/or other financial/operational parameters of the business operated by the user. In one or more embodiments, the user attribute of a contributing user (e.g., contributing user A (152a), contributing user B (153a), etc.) is stored in the repository (163). For example, the user attribute of the contributing user A (152a) is stored in the repository (163) as the user attribute A (166a). Similarly, the user attribute of the contributing user B (153a) is stored in the repository (163) as the user attribute B (166b).

In one or more embodiments, a configuration data item (e.g., configuration data item A (164a), configuration data item B (164b), etc.) includes the aforementioned configurable UI elements, configurable workflow step/sequence, and/or configuration parameters that are described in reference to FIG. 1A above. In particular, the configuration data item is generated by a contributing user to configure a localized version of the software solution (161) for performing a pre-determined task in compliance with a local requirement of the contributing user. For example, the pre-determined task may be an accounting task, a report generation task, a tax preparation task, etc.

In one or more embodiments, each configuration data item stored in the repository (163) is assigned a search tag. The search tag is metadata assigned to a configuration data item to facilitate searching the content of the repository (163). For example, the configuration data item A (164a) is generated by the contributing user A (152a) and assigned the search tag A (164b). Similarly, the configuration data item B (164b) is generated by the contributing user B (153a) and assigned the search tag B (165b). In one or more embodiments, the search tag is generated using the method described in reference to FIG. 2 below. An example of generating the search tag in a graph database is described in reference to FIG. 3C below.

In one or more embodiments, each of the configuration data items stored in the repository (163) is associated with a type. For example, the configuration data item A (164a) may be one of many different types of configuration data items. In another example, the configuration data item B (164b) may a different type of configuration data item than the configuration data item A (164a). In one or more embodiments, the types of the configuration data items correspond to functional engines of the software solution (161). For example, each of the accounting engine, reporting engine, global tax model engine, payroll engine, and tax engine of the software solution (161) may be configured using a particular type of the configuration data item to perform various functions of the software solution (161). In one or more embodiments, each type of the configuration data items conform to a type specification that specifies details of the configurable UI elements, configurable workflow step/sequence, and/or configuration parameters based on the requirement of the corresponding functional engine of the software solution (161). Multiple configuration data items may be of the same type and conform to the same type specification. In other words, the type specification is a specification of a corresponding type of configuration data items. For example, the configuration data item A (164a) may be of a first type and conform to the requirement of the reporting engine of the software solution (161). Specifically, the configuration data item A (164a) conforms to the type specification that specifies details of the configurable UI elements, configurable workflow step/sequence, and/or configuration parameters required by the reporting engine. In another example, the configuration data item B (164b) may be of a second type and conform to the requirement of the tax engine of the software solution (161). Specifically, the configuration data item B (164b) conforms to the type specification that specifies details of the configurable UI elements, configurable workflow step/sequence, and/or configuration parameters required by the tax engine.

In one or more embodiments, each type of the configuration data items are associated with a set of system selected user attributes that are generally relevant to localizing or otherwise configuring the corresponding type of functional engine. In one or more embodiments, the set of system selected user attributes include a weight for each system selected user attribute to represent a level of relationship between the system selected user attribute and the configuration data item. The set of system selected user attributes and associated weights are described in a specification of the set of the system selected user attributes. For example, the system selected user attributes of the first type of the configuration data item may include the industry, language, business size, etc., of the user, which is generally relevant to localizing the reporting engine. In another example, the system selected user attributes of the second type of the configuration data item may include the country, district, and industry of the user, which is generally relevant to localizing the tax engine. Accordingly, a functional engine is localized in a similar manner for users sharing same attribute values for one or more system selected user attributes.

An example of using the system selected user attributes to localize the software solution is described in reference to FIG. 3C below.

In one or more embodiments of the invention, the adopting user (151a) is one of the users (101) depicted in FIG. 1A above. Similarly, the contributing user (152a) is one of the contributors (102) depicted in FIG. 1A above. In one or more embodiments, the adopting user (151a) and the contributing user (152a) use the adopting user computer (151b) and the contributing user computer A (152b) to access the computer server (160). The adopting user computer (151b) and the contributing user computer A (152b) may be any computing or communication device, such as a notebook computer, laptop computer, desk-side computer, tablet computer, smartphone, etc. For example, the adopting user (151a) and the contributing user (152a) may use the adopting user computer (151b) and the contributing user computer A (152b) to access the configuration engine (162) for configuring/localizing the software solution (161). In addition, the adopting user (151a) and the contributing user (152a) may use the adopting user computer (151b) and the contributing user computer A (152b) to access the software solution (161) for performing a pre-determined task, such as the aforementioned accounting task, report generation task, tax preparation task, etc.

In one or more embodiments of the invention, the contributing user computer is configured to receive, from the contributing user, a configuration data item. For example, the contributing user computer A (152b) may be used by the contributing user A (152a) to access an authoring tool functionality of the configuration engine (162) to generate the configuration data item A (164a). In another example, the contributing user computer B (153b) may be used by the contributing user B (153a) to access the authoring tool functionality to generate the configuration data item B (164b).

In one or more embodiments, a first localized version of the software solution (161) is generated by the configuration engine (162) using the configuration data item A (164a). Accordingly, the contributing user computer A (152b) accesses the first localized version of the software solution (161) to perform a pre-determined task of the contributing user A (152*a*). In one or more embodiments, the software solution (161) is a globally scaled software solution, such as the configurable product (120) depicted in FIG. 1A above. In such embodiments, the contributing user computer A (152*b*) accesses the first localized version of the software solution (161) via the computer network (110) to perform the pre-determined task in compliance with a local requirement of the contributing user A (152*a*) Similarly, the contributing user computer B (153*b*) accesses another localized version of the software solution (161) via the computer network (110) to perform the pre-determined task in compliance with a local requirement of the contributing user B (153*a*).

In one or more embodiments, the contributing user computer is further configured to receive, from the contributing user and in conjunction to the configuration data item, a contributing user attribute specification. In particular, the contributing user attribute specification includes a selection from the set of system selected user attributes and corresponding user attribute values of the contributing user. Specifically, the selection specifies one or more user attributes from the set of system selected user attributes. For example, the contributing user computer A (152*b*) may be used by the contributing user A (152*a*) to access the authoring tool functionality of the configuration engine (162) to submit the contributing user attribute specification for indexing the configuration data item A (164*a*). In another example, in conjunction with submitting the configuration data item B (164*b*), the contributing user computer B (153*b*) may be used by the contributing user B (153*a*) to submit another contributing user attribute specification for indexing the configuration data item B (164*b*). An example of the system selected user attributes and the contributing user attribute specification is described in reference to FIG. 3C below.

In one or more embodiments, the adopting user computer (151*b*) is configured to receive, from the adopting user (151*a*), a request for a recommended configuration data item of a particular type. In one or more embodiments, the request is sent to the configuration engine (162) to search in the repository (163). In return, the configuration engine (162) selects an applicable configuration data item to localize the software solution (161) for the adopting user (151*a*). Accordingly, the adopting user computer (151*a*) is used by the adopting user (151*a*) to access a localized version of the software solution (161) via the computer network (110) to perform a pre-determined task, such as the aforementioned accounting task, report generation task, tax preparation task, etc.

In one or more embodiments of the invention, the configuration engine (162) is configured to (i) receive configuration data items from contributing users, (ii) generate search tags based on contributing user attribute specifications to index the received configuration data items, and (iii) search the indexed configuration data items to select a recommended configuration data item in response to a request from an adopting user. In one or more embodiments, the configuration engine (162) performs these functions using the method described in reference to FIG. 2B below. In particular, the search tag is generated based on the contributing user attribute specification associated with the configuration data item. Accordingly, the configuration engine (162) generates a localized version of the software solution for a contributing user based on the configuration data item received from the contributing user. In contrast, the configuration engine (162) recommends a previously generated localized version of the software solution for an adopting user by matching the adopting user's attributes to the search tags of the indexed configuration data items. For example, the search result may select the configuration data item A (164*a*) based on matching the user attributes of the adopting user (151*a*) to the search tag A (165*a*). Accordingly, the previously generated localized version of the software solution based on the configuration data item A (164*a*) is recommended to the adopting user (151*a*). In contrast, the configuration data item B (164*b*) is excluded from the search result due to mismatch between the user attributes of the adopting user (151*a*) and the search tag B (165*b*). For example, the mismatch may be due to the type of configuration data item requested by the adopting user (151*a*) being different than the type of the configuration data item B (164*b*). In another example, the mismatch may result from a difference in the portion of the system selected user attributes between the adopting user (151*a*) and the contributing user B (153*a*) where the portion is identified based on the contributing user attribute specification submitted by the contributing user B (153*a*).

An example of recommending a previously generated localized version of the software solution for an adopting user is described in reference to FIG. 3C below.

Figure 2A:
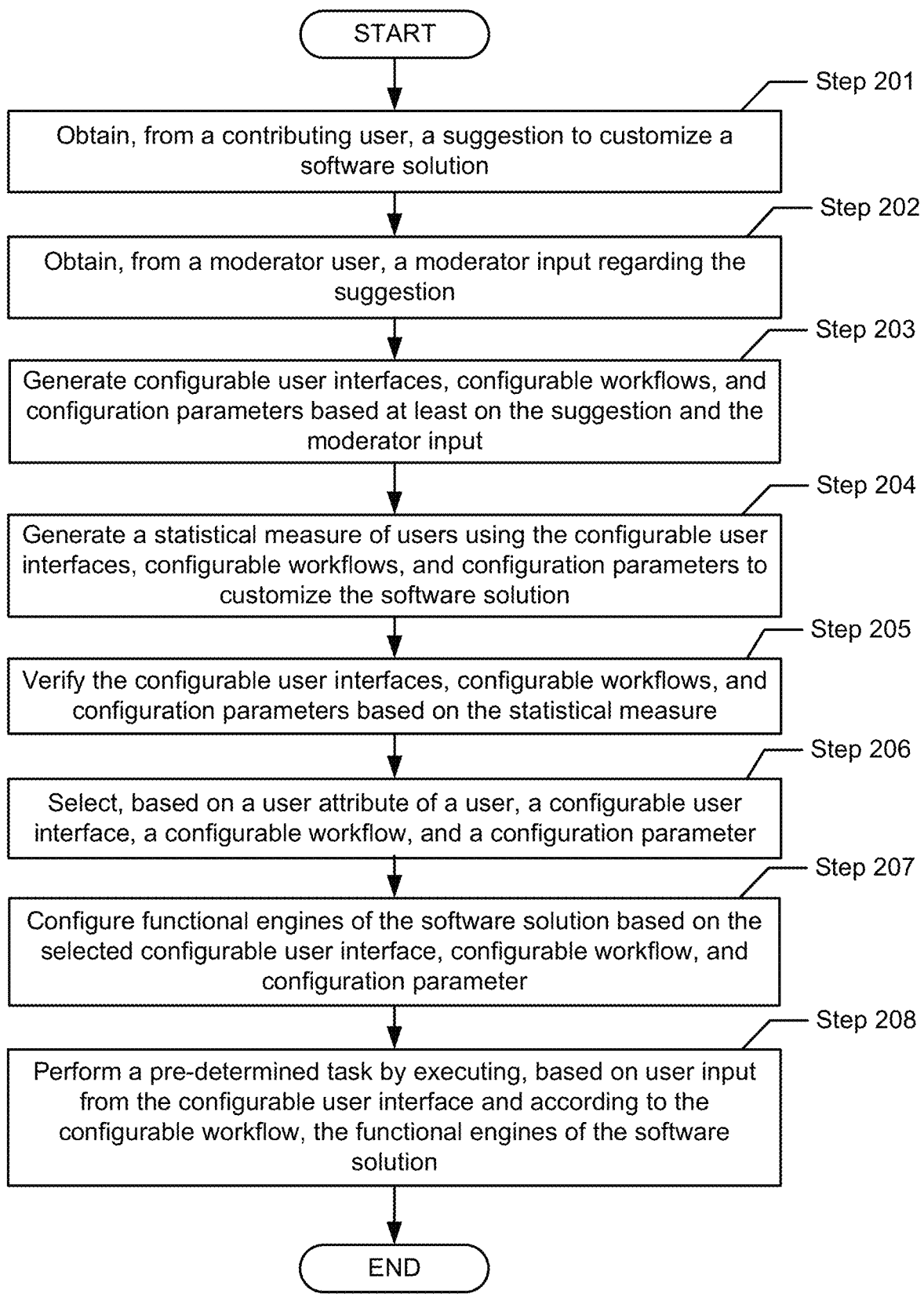
FIG. 2A shows a flowchart of a method for globally scalable software in accordance with one or more embodiments of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method described in reference to FIG. 2A may be practiced using the system A (100*a*) and system B (100*b*) described in reference to FIG. 1A and FIG. 1B above and/or involving the computing system (400) described in reference to FIG. 4.

As noted above, techniques for customizing a product or solution to be scalable and meeting the challenges created by Internet-based promotion and distribution is advantageous. Scalability allows a global product or solution targeting a vast number of different types of users across international regions to compete with a local product focusing on a single type of user.

The method described in reference to FIG. 2A provides scalability by employing a crowd sourcing technique that is rooted in Internet technology. Generally, crowd sourcing is the process of obtaining needed services, ideas, or content by soliciting contributions from a large group of people, and especially from an online community, rather than from traditional employees or suppliers. In particular, crowd sourcing is distinguished from out sourcing in that the work comes from an undefined public rather than being commissioned to a specific, named group. Because the result of generic crowd source comes from the undefined public, it is important to monitor the process and maintain the quality of the result. In one or more embodiments of the invention, the method described in reference to FIG. 2A employs a statistical qualification procedure to ensure the quality of customizing a product using the crowd sourcing technique. Specifically, the product may take the form of an online software solution.

Initially in Step 201, a suggestion is obtained from a contributing user to customize a software solution. In one or more embodiments of the invention, the suggestion is based on a business requirement specific to a user attribute of a user of the software solution. In one or more embodiments, the software solution is initially developed by a centralized development team of a global software provider that provides the software solution. In contrast, the contributing user and the user of the software solution may be located in geographical locations throughout the world.

In Step 202, in response to reviewing the business requirement specific to a user attribute of the user, a moderator input regarding the suggestion is obtained from a moderator user. In one or more embodiments, the moderator user belongs to the centralized development team. In one or more embodiments, the moderator user is located away from the centralized development team and in geographical locations throughout the world.

In Step 203, configurable user interfaces, configurable workflows, and configuration parameters are generated based at least on the suggestion and the moderator input. In one or more embodiments of the invention, the configurable user interfaces, configurable workflows, and configuration parameters are generated further based on a compliance requirement obtained from a local regulatory agency of the geographical region. In one or more embodiments, the configurable user interfaces, configurable workflows, and configuration parameters are generated automatically without manual intervention.

In Step 204, a statistical measure of a group of users is generated. In one or more embodiments of the invention, the statistical measure represents how the group of users uses the configurable user interfaces, configurable workflows, and configuration parameters to customize the software solution for performing a pre-determined task. In one or more embodiments, the statistical measure is generated using a machine learning algorithm based on a correlation between user attributes of the group of users and selections made by the group of users among the configurable user interfaces, configurable workflows, and configuration parameters to customize the software solution.

In Step 205, the configurable user interfaces, configurable workflows, and configuration parameters are verified based on the statistical measure. In one or more embodiments of the invention, the configurable user interfaces, configurable workflows, and configuration parameters are verified using the machine learning algorithm Specifically, verifying the configurable user interfaces, configurable workflows, and configuration parameters requires that the aforementioned correlation meets a pre-determined criterion. In one or more embodiments, prior to the verification, the configurable user interfaces, configurable workflows, and configuration parameters are adjusted using the machine learning algorithm until the aforementioned correlation meets the pre-determined criterion.

In Step 206, based on a user attribute of a user, a configurable user interface, a configurable workflow, and a configuration parameter are selected from the configurable user interfaces, configurable workflows, and configuration parameters generated in the Step 205. In one or more embodiments of the invention, the selection is based on a match between the user attribute of the user and user attributes of contributing users who provided suggestions to the selected configurable user interface, the selected configurable workflow, and the selected configuration parameter.

In Step 207, one or more functional engines of the software solution are configured based on the user attribute of the user. Specifically, the one or more functional engines are configured based on the selected configurable user interface, the selected configurable workflow, and the selected configuration parameter.

In Step 208, subsequent to configuring the functional engines of the software solution based on the user attribute of the user, a pre-determined task of the user is performed. In one or more embodiments of the invention, the pre-determined task is performed by (a) receiving a user input from the user via the selected configurable user interface and (b) executing, based on user input and according to the selected configurable workflow, one or more functional engines of the software solution.

Figure 2B:
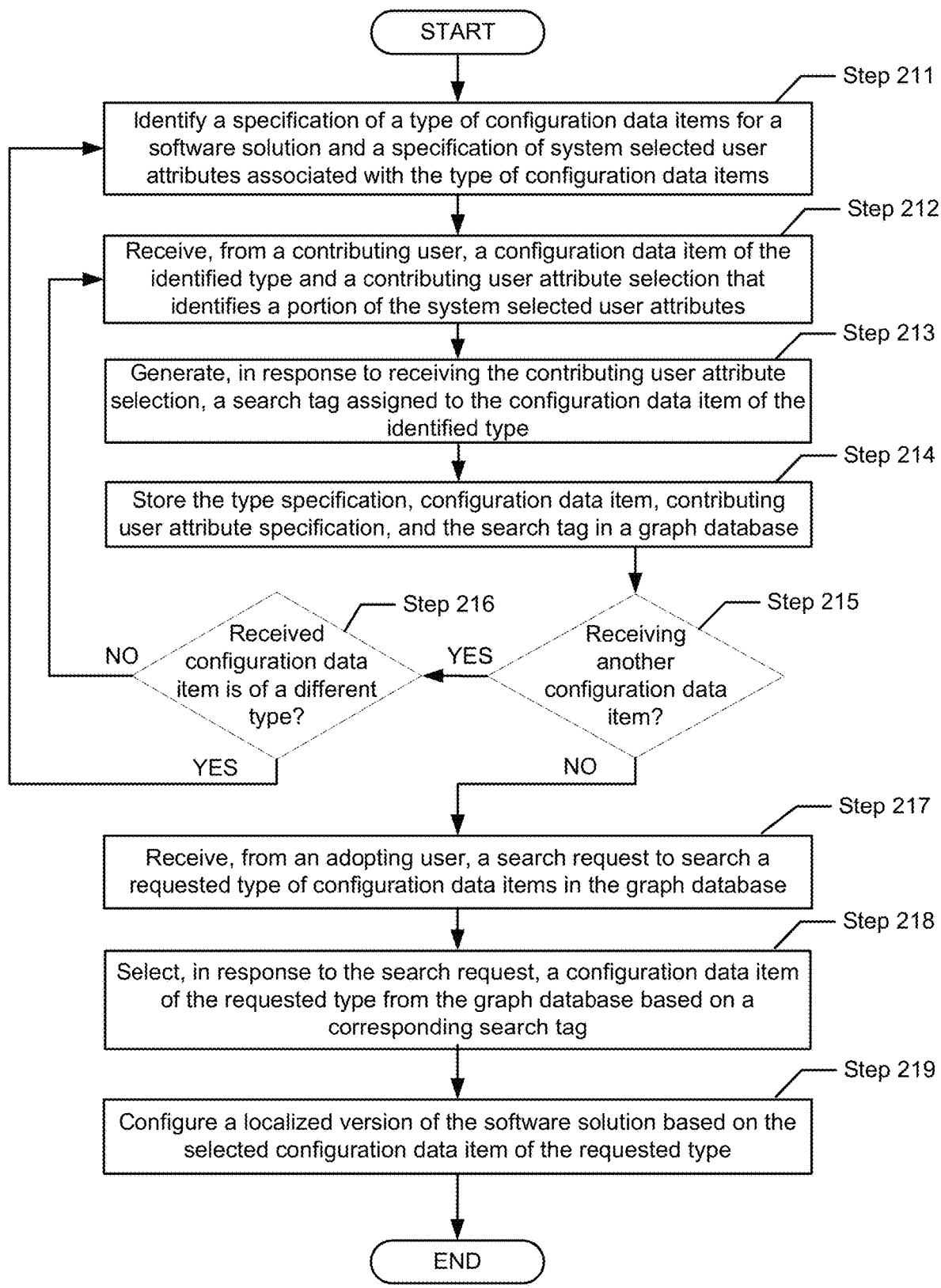
FIG. 2B shows a flowchart of a method for matching adopting users and contributing users for decentralized software localization in accordance with one or more embodiments of the invention.

FIG. 2B depicts a flowchart of a method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method described in reference to FIG. 2B may be practiced using the system A (100a) and system B (100b) described in reference to FIG. 1A and FIG. 1B above and/or involving the computing system (400) described in reference to FIG. 4.

Initially in Step 211, a type specification (i.e., a specification of a type of configuration data items) of a software solution and a specification of a set of system selected user attributes associated with the type of configuration data items are identified. In one or more embodiments of the invention, the specifications are received at a computer server hosting the software solution. For example, the specifications may be defined by a centralized developer or a regional product manager of the software solution and inputted into the computer server. In one or more embodiments of the invention, the specifications are stored in a graph database in the data repository of the computer server. In particular, the type specification is stored in a parent node of the graph database. In addition, each system selected user attribute associated with the identified type of configuration data items is stored in a child node coupled to the parent node. In one or more embodiments, the link coupling the system selected user attribute and the type specification is assigned a weight to represent a level of relationship between the system selected user attribute and the type of configuration data items. Accordingly, the type specification and the specification of the associated set of system selected user attributes are stored in a node tree of the graph database with the type specification stored in the parent node of the node tree. In one or more embodiments, multiple type specifications and specifications of associated system selected user attributes are stored in multiple node trees having multiple parent nodes in the graph database. An example of storing and identifying the specifications in a graph database is described in reference to FIG. 3C below.

In Step 212, a configuration data item of the identified type is received from a contributing user. For example, the contributing user may be at a remote location from the centralized developer and require a localized version of the software solution. In one or more embodiments of the invention, the received configuration data item is used by the computer server to configure the localized version of the software solution for the contributing user. In particular, this localized version is accessed by the contributing user to perform a pre-determined task in compliance with a local requirement of the contributing user. For example, the pre-determined task is performed by the software solution using a customized function engine associated with the identified type. In one or more embodiments, the contributing user contributes the configuration data item and his/her localized version of the software solution to be shared among other users of the software solution.

In one or more embodiments of the invention, a contributing user attribute specification associated with the received configuration data item is received from the contributing user. As noted above, the contributing user attribute specification specifies a portion of the system selected user attributes and corresponding user attribute value(s) of the contributing user. For example, the contributing user attribute specification may specify a first user attribute and a second user attribute from the set of system selected user attributes. In particular, the first user attribute may describe a geographical location of the business operated by a corresponding user and the second user attribute may describe an industry where the business belongs.

In one or more embodiments of the invention, the received configuration data item is stored in the graph database as an instance of the type specification. For example, the received configuration data item may be stored in an instance node coupled to the parent node storing the type specification. In one or more embodiments, the contributing user attribute specification is stored in the graph database by storing each user attribute value specified in the contributing user attribute specification. In particular, each contributing user attribute value may be stored in the graph database as an instance of a corresponding system selected user attribute. For example, such an instance may be stored in an instance node coupled to the node storing the corresponding system selected user attribute. For example, a first contributing user attribute value may be stored in an instance node coupled to the node storing the first attribute in the aforementioned node tree. Similarly, the second contributing user attribute value may be stored in another instance node coupled to the other node storing the second attribute in the aforementioned node tree. In addition, the instance node storing the configuration data item is coupled to the instance nodes storing the first and second contributing user attribute values to represent the contributing user attribute specification. As used herein, the contributing user attribute value is a value of the corresponding user attribute for the contributing user.

An example of storing the configuration data item and the associated contributing user attribute specification in the graph database is described in reference to FIG. 3C below.

In Step 213, in response to receiving the contributing user attribute specification, a search tag is generated based on the contributing user attribute specification and assigned to the configuration data item of the type identified in Step 211 above. In one or more embodiments of the invention, the search tag includes information specified by the contributing user attribute specification. For example, the search tag may include the first contributing user attribute value and the second contributing user attribute value.

In Step 214, the search tag assigned to the configuration data item is stored in the data repository in conjunction with the type specification, the configuration data item, and the associated contributing user attribute specification. In one or more embodiments of the invention, the search tag is stored as links coupling the instance nodes storing the configuration data item and associated contributing user attribute values. An example of storing the search tag assigned to the configuration data item in the graph database is described in reference to FIG. 3C below.

In Step 215, a determination is made as to whether any more received configuration data item is waiting to be processed. If the determination is positive, i.e., at least one more configuration data item has been received at the computer server and is pending to be processed, the method proceeds to Step 216. If the determination is negative, i.e., no other configuration data item is pending to be processed, the method proceeds to Step 217.

In Step 216, a determination is made as to whether the pending configuration data item is of a different type than the previous configuration data item just processed from Step 212 through Step 214. In particular, the pending configuration data item may be received from the same contributing user of the previous configuration data item just processed or from a different contributing user. If the determination is positive, i.e., the pending configuration data item is of a different type, the method returns to Step 211 where another type specification is identified to process the pending configuration data item. If the determination is negative, i.e., the pending configuration data item is of the same type as the previous configuration data item just processed, the method returns to Step 212 where the pending configuration data item and associated contributing user attribute selection are stored in the graph database to expand the aforementioned node tree based on the parent node storing the previously identified type specification.

In Step 217, a search request is received from an adopting user to search a requested type of configuration data items. In one or more embodiments of the invention, the adopting user submits the search request to select a suitable configuration data item of the requested type for localizing the software solution to perform a pre-determined task of the adopting user. In particular, the search request specifies the requested type that is associated with the pre-determined task. For example, if the pre-determined task involves completing a deductible expense filing form for tax preparation, the requested type may relate to the tax preparation engine and the deductible expense filing form. In one or more embodiments, the search request includes or otherwise is associated with user attribute values of the adopting user, which are referred to as adopting user attribute values.

In Step 218, in response to the search request, the aforementioned graph database is searched to select the suitable configuration data item of the requested type. In one or more embodiments of the invention, the suitable configuration data item of the requested type is selected by traversing the graph database from the parent node storing the type specification of the requested type. In particular, all instance nodes of the parent node are traversed. Traversing a particular instance node includes traversing all linked nodes of the particular instance node that store contributing user attribute values associated with the configuration data item stored in the particular instance node.

In one or more embodiments, a search tag matching score of the particular configuration data item is computed based on the contributing user attribute values retrieved from these linked nodes. In one or more embodiments, the search tag matching score represents a level of similarity between the retrieved contributing user attribute values and the adopting user attribute values. For example the search tag matching score may be computed as inversely proportional to a difference between the retrieved contributing user attribute values and the adopting user attribute values. The difference may correspond to a Euclidean distance between the retrieved contributing user attribute values and the adopting user attribute values in a multi-dimensional vector space. For example, the difference may include a first difference for the aforementioned first user attribute and a second difference for the aforementioned second user attribute. Accordingly, the Euclidean distance is computed as a root-mean-square or a quadratic mean of the first difference and the second difference. In one or more embodiments, the first difference and the second difference are weighted based on the aforementioned weights in a formula for computing the quadratic mean.

In one or more embodiments, the suitable configuration data item of the requested type is selected from the graph database based on the search tag matching score meeting a pre-determined criterion. For example, the suitable configuration data item is identified during the graph database traversal when the computed search tag matching score exceeds a pre-determined threshold value. For example, a configuration data item previously submitted by a contributing user sharing certain similar user attribute values (based on the contributing user attribute specification) with the adopting user may be selected as the suitable configuration data item. Other user attributes not included in the contributing user attribute specification may not have similar values between the contributing user and the adopting user for making the selection.

In Step 219, in response to selecting the suitable configuration data item of the requested type, a localized version of the software solution for the adopting user is configured based on the selected suitable configuration data item. Accordingly, this localized version is accessed by the adopting user to perform a pre-determined task in compliance with a local requirement of the adopting user. For example, a tax preparation engine may be customized in the software solution based on a deductible expense type (i.e., requested type) of configuration data item to generate and complete a deductible expense filing form for the adopting user.

Figure 3A:
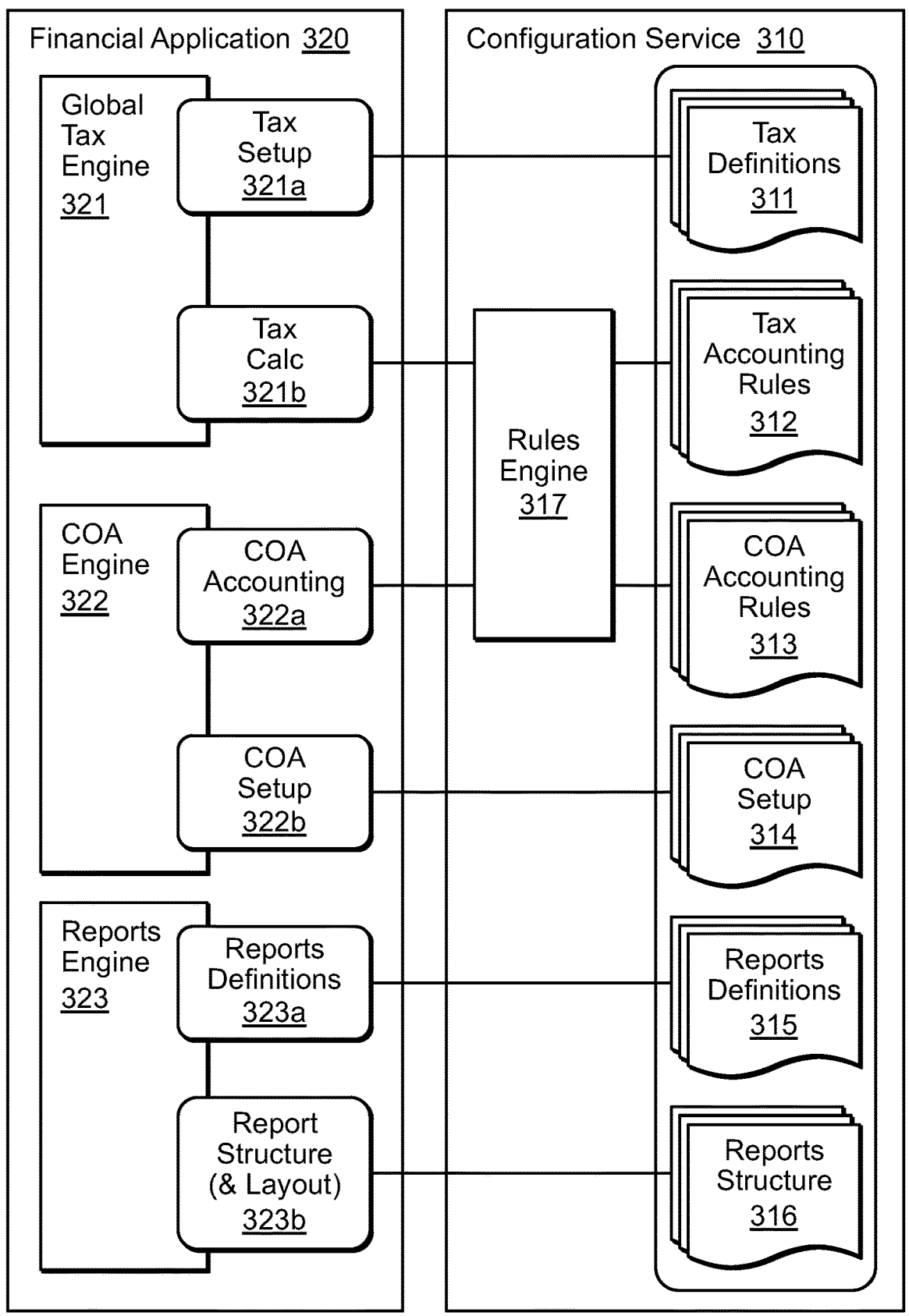
FIG. 3A and FIG. 3B show an example of globally scalable software in accordance with one or more embodiments of the invention.
Figure 3B:
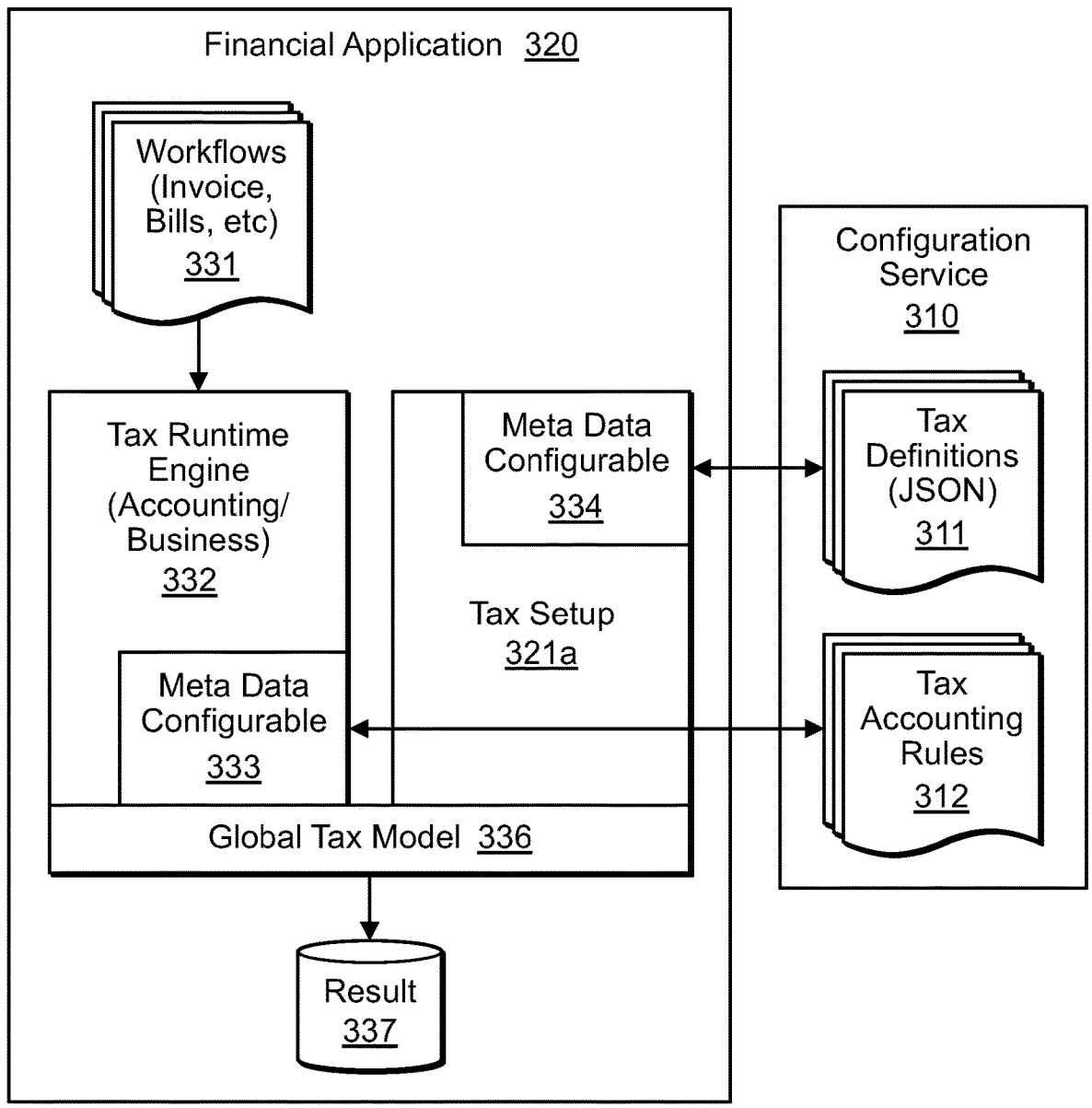

FIG. 3A and FIG. 3B each show an application example of globally scalable software in accordance with one or more embodiments of the invention. This application example may be practiced using the system A (100a) of FIG. 1A or the computing system (400) of FIG. 4, and be based on the method described with respect to FIG. 2A above. In this example, several terms are used that should be defined.

Chart of Accounts

A chart of accounts is a foundational feature of many accounting solutions and refers to the list of accounts created by a business to record transactions for income and expense in a collection of accounting records commonly referred to as the general ledger. Across the global markets, the chart of accounts may vary from being very flexible (e.g., in the United States) to being highly prescriptive (e.g., France and other European Union countries).

Indirect Taxes

An indirect tax is commonly defined as an indirect tax that is collected by an intermediary (e.g., a retail store) from the person (e.g., a consumer) who bears the ultimate economic burden of the tax. Examples of the indirect tax include sales tax, value added tax (VAT), goods and services tax (GST), and other specific taxes. The indirect tax may be levied at the point-of-sale or at the time of invoicing. A business, acting as a tax collector for a tax agency, is required to maintain accurate accounting for and to track and report such taxes collected in compliance with local norms and standards. Specifically, the business is required to perform necessary filings and submit associated tax payments to the applicable agencies.

Reports

Reports are another critical aspect of variance across markets, and form a core feature that enables small businesses to gain critical insight into how their business is performing Some examples of common reports include profit-and-loss report, balance sheet, cash-flow report, etc.

Transaction Forms

Transaction forms are the primary means of representing the activities a small business has with customers and vendors. Examples of transaction forms include invoices, sales receipts, etc. These forms may exhibit a high degree of variance from market to market and are a prime candidate to be made configurable.

FIG. 3A shows an example of the MAP described above. Specifically, FIG. 3A shows details of a financial application (320) and configuration service (310), which are examples of the configurable product (120) and configuration service (110), respectively, depicted in FIG. 1A above. As shown in FIG. 3A, the financial application (320) includes a global tax engine (321) associated with a tax setup module (321a) and a tax calculation module (321b), a chart of accounts (COA) engine (322) associated with a COA accounting module (322a) and a COA setup module (322b), and a reports engine (323) associated with a reports definitions module (323a) and a report structure and layout module (323b). Further, the configuration service (310) includes a rules engine (317) and various configuration information (e.g., configuration parameters, templates, rules, etc.), such as the tax definitions (311), tax accounting rules (312), COA accounting rules (313), COA setup (314), reports definitions (315), and reports structure (316).

In the example shown in FIG. 3A, the financial application (320) is customized for a user in a particular region by using various modules of the global tax engine (321), the COA engine (322), and the reports engine (323) to receive configuration information from the configuration service (310). For example, the tax setup module (321a) receives the tax definitions (311), the COA setup module (322b) receives the COA setup (314), the reports definitions module (323a) receives the reports definitions (315), and the report structure and layout module (323b) receives the reports structure (316). In addition, the tax calculation module (321b) and the COA accounting module (322a) are configured based on the rules engine (317) using the tax accounting rules (312) and the COA accounting rules (313).

For example, the set up of chart of accounts, which exhibits high variance across markets, has been made completely configurable, with no code changes. The management of the master list of all COAs for different regions has been refactored into the configurable rules engine (317), and the configuration metadata that drives the behavior of the rules engine (317) is maintained in the configuration service (310) as the COA accounting rules (313).

In another example, the indirect tax is a key concern to the financial application (320) that has to determine what accounts are used to hold the collected indirect taxes according to the local norms and/or regulations in the local markets. As an invoicing system, in addition to core financial management, the financial application (320) also needs to be able to help the SBO (i.e., small business owner) determine when an indirect tax needs to be collected, how much needs to be collected, and the point in the course of completing the business transaction for which this tax is owed (i.e., tax point).

FIG. 3B shows additional details of the financial application (320) and the configuration service (310) that provide ability for the SBO to derive necessary insights into the indirect taxes they have collected, and the workflows that directly or indirectly enable the SBO in their obligation to file the taxes owed to the appropriate tax agencies in an accurate and timely fashion.

As shown in FIG. 3B, tax setup (321a) has been made configurable through the tax definitions (311) and tax accounting rules (312) that are served out of the configuration service (310) as metadata (333) and (334). A portion of the metadata (334) may also correspond to the company profile of the SBO. With new taxes defined by the tax definitions (311) and tax accounting rules (312), the tax setup module (321a) is able to set up the tax structures based on the metadata (334). In addition, the global tax engine (321) shown in FIG. 3A has been partitioned into the tax runtime engine (332) and the global tax model (336). Accordingly, the tax runtime engine (332) is able to apply any incremental tax changes or tax updates directly through metadata (333). Once the tax structures are set up by the tax setup module (321a) and the tax runtime engine is configured based on the metadata (333), workflows (331) are performed to generate the result (337), such as an invoice or a bill. For example, the invoice or bill is in the local language, conforms to the format of local practice, and includes taxes in compliance with local regulation.

Although not explicitly shown in FIGS. 3A and 3B, the workflows (331) and other configuration information maintained by the configuration service (310) are acquired or otherwise generated using a contribution system (e.g., the contribution management system (130) depicted in FIG. 1A above) that is layered on top of the configuration capabilities of the MAP. For example, the contribution management system (130) makes it possible to empower the financial application provider's extended network of partners, accountant communities and even SBOs themselves to configure and fine-tune the financial application (320) to the right "fit" for a given market. In particular, this extended community may include two distinct types of players, namely (a) accountants and other expert contributors and (b) SBOs themselves.

In the case of accountants and other expert contributors, their contributions are "out-of-band" to the financial application (320). In other words, their contributions are based on information obtained through extensive interviews and translated into product requirements. The software capabilities meeting these requirements are then implemented in the financial application (320). For example, market analysts in France are engaged to provide the VAT rates and codes in an excel spreadsheet such that the software provider's engineers interpret and translate the inputs into tax metadata, such as the tax definitions (311) and tax accounting rules (312). The contribution management system (130) includes authoring tools and curating/validation capabilities that make it possible for accountants and other expert contributors to directly contribute their inputs into the financial application (320). Product managers and engineers of the software provider then curate such inputs and, upon validation, apply these inputs into the financial application (320).

In the case of SBOs, there is a long tail of right-for-me use cases that are too specific for tackling incrementally, even with the extended network of accountants and other paid experts. Some examples include specialized transactions such as rental deposits that only apply in real estate and other rent/hire oriented industries. The contribution management system (130) includes authoring tools and curating/validation capabilities that make it possible for the SBOs to define their own transaction types based on templates from existing, native transactions in the financial application (320). The SBOs may optionally share the customization with other SBOs in the user community of the financial application (320).

In summary, the authoring tools of the contribution management system (130) enable the right set of users to make their contributions in the right places in the financial application (320) and to have visibility into where their contributions are in the curation pipeline. Appropriate rewards/incentives are provided to encourage contributions that benefit the wider user community.

In addition to soliciting, incentivizing, curating and making such explicit contributions work for the benefit of the user community, the contribution management system (130) includes self-learning and predictive capabilities. For example, collaborative filtering techniques are used to obtain implicit contributions based on how SBO users manually configure the financial application (320). Recommendations are generated and presented to other businesses similar to the contributing SBO. For example, if it is observed that a significant number of businesses in California adjusted their base sales tax rates starting Jan. 1, 2016, recommendation may be made to other SBOs subject to the sales tax regime of California.

Figure 3C:
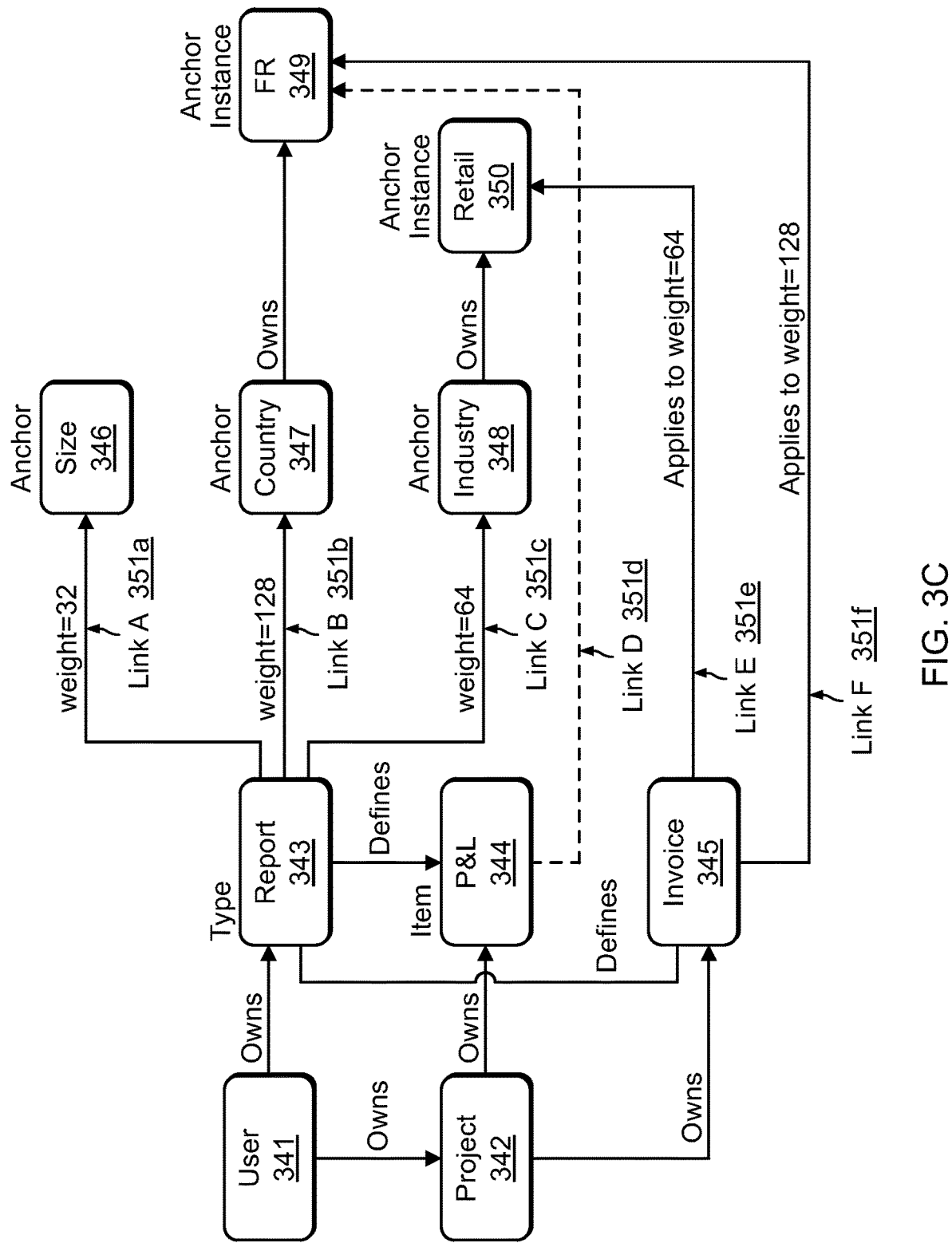
FIG. 3C shows an example of matching adopting users and contributing users for decentralized software localization in accordance with one or more embodiments of the invention.

FIG. 3C shows an example of matching adopting users and contributing users for decentralized software localization in accordance with one or more embodiments of the invention. This application example may be practiced using the system B (100b) of FIG. 1B or the computing system (400) of FIG. 4 and be based on the method described with respect to FIG. 2B above.

FIG. 3C shows an example node tree in a graph database described above.

Specifically, the node tree includes a parent node (343) storing a type specification that specifies configuration data items to customize a report. For example, the type specification for the type "report" may be defined and stored in the graph database by a centralized developer in the United States who is represented by the user node (341). For example, the user node (341) may store a name, profession, business title, contact information, etc. of the centralized developer. The centralized developer may also specify a number of system selected user attributes referred to as anchors in FIG. 3C. Specifically, the anchors include a size node (346) corresponding to a business size, a country node (347) corresponding to a country where the business operates, and an industry node (348) corresponding to an industry category of the business. The size node (346), country node (347), and industry node (348) are child nodes of the parent node (343) and are linked to the parent node (343) via the link A (351a), link B (351b), and link C (351c), respectively. The centralized developer also assigns weights to the link A (351a), link B (351b), and link C (351c), which are 32, 128, and 64, respectively.

As shown in FIG. 3C, a contributing user (not shown) associated with a software localization project (represented by the project node (342)) has submitted a configuration data item of the type "report" to be stored in the P&L (profit and loss) node (344). The configuration data item stored in the P&L node (344) includes descriptions of various data fields and a layout template of a P&L report. In particular, the configuration data item stored in the P&L node (344) is used to generate the P&L report according to a regulatory requirement of the country France where the contributing user operates his business. The P&L node (344) is a child node of the parent node (343). As used herein, the P&L node (344) is also referred to as an instance node of the parent node (343) since the P&L report is an instance of the type "report". In conjunction with submitting the configuration data item to be stored in the P&L node (344), the contributing user also selects the country attribute in a corresponding contributing user attribute specification. Accordingly, the name of the country France (FR) is stored in an country instance node (349) of the country node (347). In addition, the P&L node (344) is coupled to the country instance node (349) via the link D (351d), which essentially assigns the country attribute value "FR" as the search tag for the P&L node (344).

Further as shown in FIG. 3C, the contributing user has also submitted another configuration data item of the type "report" to be stored in the invoice node (345). The configuration data item stored in the invoice node (345) includes descriptions of various data fields and a layout template of an invoice. In particular, the configuration data item stored in the invoice node (345) is used to generate the invoice according to a regulatory requirement of the country France. The invoice node (345) is also a child node of the parent node (343) Similar to the P&L node (344), the invoice node (345) is also referred to as an instance node of the parent node (343) since the invoice is also an instance of the type "report". In conjunction with submitting the configuration data item to be stored in the invoice node (345), the contributing user selects both the country attribute and the industry attribute in a corresponding contributing user attribute specification. Accordingly, in addition to storing the name of the country France (FR) in the country instance node (349), the industry category "retail" of the contributing user's business is stored in an industry instance node (350). In addition, the invoice node (345) is coupled to the country instance node (349) and the industry instance node (350) via the link E (351e) and the link F (351f), respectively, which essentially assign the country attribute instance value "FR" and the industry attribute value "retail" as the search tag for the invoice node (345).

Based on inputs to the graph database from the centralized developer in the United States and contributing user in France, an adopting user operating an international retail business submits a search request to search the graph database for various reports suitable to a French division of his international business. The search request includes the country attribute value "FR" and industry attribute value "retail" based on the adopting user's attributes. As described above, a configuration engine traverses the graph database and computes search tag matching scores by comparing the contributing-user-attribute-based search tag and the adopting user attribute values. Accordingly, the configuration data items stored in the P&L node (344) and/or invoice node (345) may be selected and returned as a search result for the search request of the adopting user.

Although the example shown in FIG. 3C describes one node tree with a single parent node associated with a particular type (i.e., report), the graph database used by the configuration engine may include multiple node trees storing multiple type specifications in multiple parent nodes.

Figure 4:
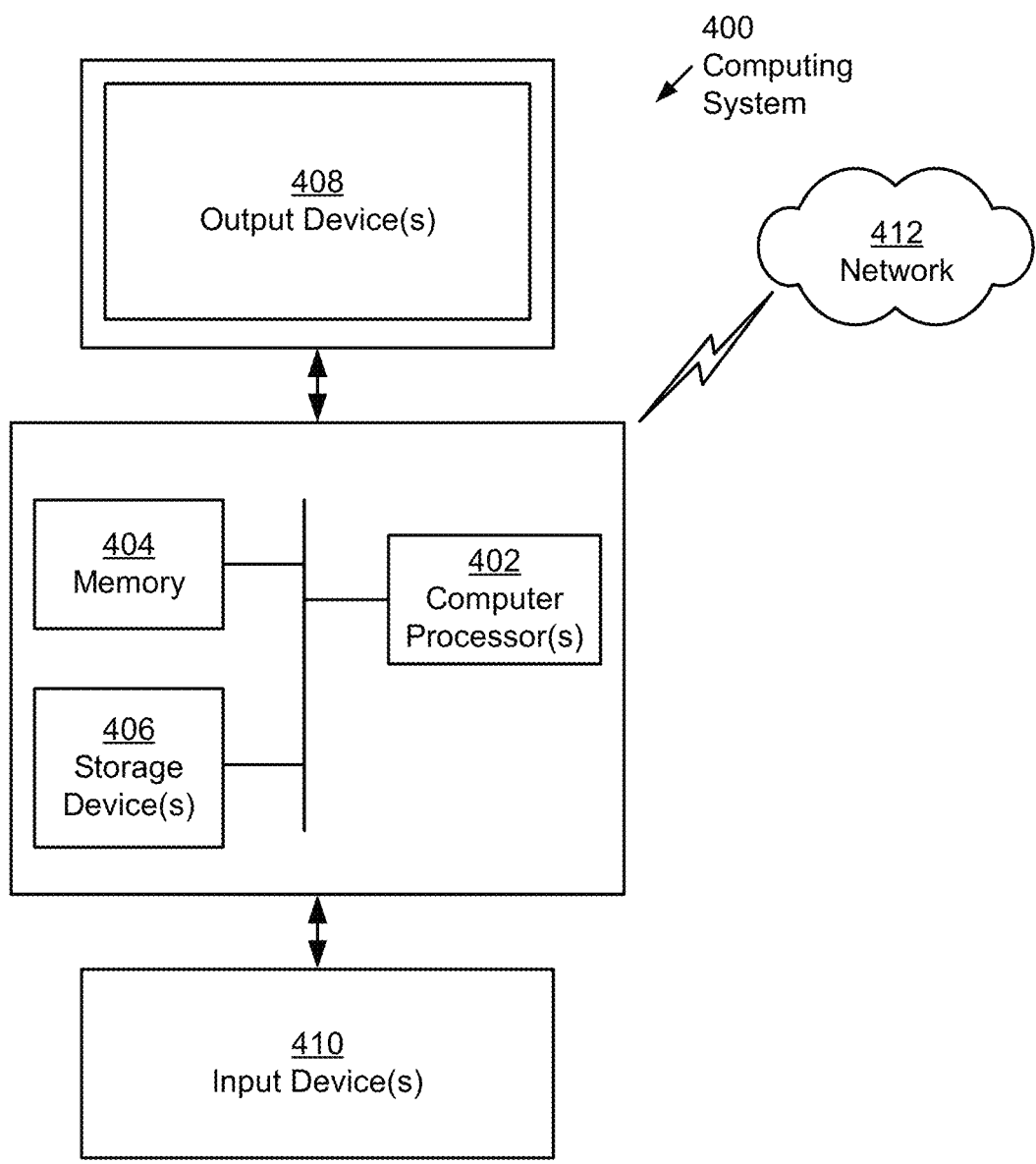
FIG. 4 shows a diagram of a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device. The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system to configure a software solution, comprising:
   a computer server hosting the software solution and comprising:
      a configuration engine configured to:
         receive a first specification of a first type of configuration data items and a second specification of a first plurality of system selected user attributes associated with the first type of configuration data items;
         configure a first localized version of the software solution for a contributing user based on a first configuration data item of the first type;
         generate a first search tag assigned to the first configuration data item of the first type;

select, in response to a search request, the first configuration data item of the first type based on the first search tag; and configure, in response to selecting the first configuration data item of the first type, a second localized version of the software solution based on the first configuration data item of the first type; and a repository configured to:

store a plurality of configuration data items of the first type that comprises the first configuration data item of the first type, wherein the plurality of configuration data items of the first type are received from a plurality of contributing users that comprises the contributing user;

a contributing user computer configured to:

receive, from the contributing user, the first configuration data item of the first type for sending to the configuration engine;

access the first localized version of the software solution via a computer network to perform a first pre-determined task of the contributing user in compliance with a first local requirement of the contributing user; and further receive, from the contributing user, a first contributing user attribute specification that specifies a first user attribute and a second user attribute of the first plurality of system selected user attributes, wherein the first search tag is assigned to the first configuration data item of the first type in response to receiving the first contributing user attribute specification, and wherein the first search tag comprises a first contributing user attribute value of the first user attribute and a second contributing user attribute value of the second user attribute for the contributing user; and an adopting user computer configured to:

receive, from an adopting user, the search request for sending to the configuration engine to search the first type of configuration data items; and access the second localized version of the software solution via the computer network to perform the first pre-determined task of the adopting user in compliance with a second local requirement of the contributing user, wherein the computer network is configured to couple the computer server, the contributing user computer, and the adopting user computer, wherein the software solution comprises a financial software solution, wherein the first type of configuration data items comprises a category of financial report templates, wherein the first configuration data item of the first type comprises a financial report template of the category, wherein accessing the first localized version by the contributing user to perform the first pre-determined task comprises generating a first financial report of the contributing user based on the financial report template, and wherein accessing the second localized version by the adopting user to perform the first pre-determined task comprises generating a second financial report of the adopting user based on the financial report template.

2. The system of claim 1, wherein the first user attribute comprises a geographical location, wherein the first local requirement is specific to the geographical location of the contributing user, wherein the second user attribute comprises an industry, and wherein the first localized version is accessed by the contributing user to perform the first pre-determined task further in compliance with an industry requirement of the industry of the contributing user.

3. The system of claim 1, the configuration engine further configured to:

store the first specification in a node of a graph database in the repository;

store the first configuration data item of the first type in a child node of the node in the graph database;

store each of the first plurality of system selected user attributes in one of a plurality of additional nodes of the graph database, wherein the plurality of additional nodes comprises a first additional node for storing the first user attribute and a second additional node for storing the second user attribute;

store the first contributing user attribute value of the first user attribute for the contributing user in a first additional child node of the first additional node in the graph database;

store the second contributing user attribute value of the second user attribute for the contributing user in a second additional child node of the second additional node in the graph database;

store the first contributing user attribute specification in a first link and a second link of the graph database, wherein the first link couples the child node and the first additional child node, wherein the second link couples the child node and the second additional child node; and compare the search request and the first search tag to generate a matching score, wherein selecting, in response to the search request, the first configuration data item of the first type is further based on the matching score meeting a pre-determined criterion.

4. The system of claim 3, the configuration engine further configured to:

further receive a weight for each of the first plurality of system selected user attributes, wherein each weight represents a level of relationship between a corresponding system selected user attribute and the first type of configuration data items; and store each weight in a user attribute link coupling the node and a corresponding one of the plurality of additional nodes in the graph database, wherein the search request comprises a first adopting user attribute value of the first user attribute and a second adopting user attribute value of the second user attribute for the adopting user, and wherein comparing the search request and the first search tag comprises:

traversing, based on the search request, the graph database to:

select the child node from a plurality of child nodes of the node; and further selecting, in response to selecting the child node, the first additional child node and the second additional child node based on the first link and the second link;

retrieving, in response to traversing the graph database, the first search tag from the first additional child node and the second additional child node;

matching the first contributing user attribute value in the first search tag and the first adopting user attribute value in the search request to generate a first partial score;

matching the second contributing user attribute value in the first search tag and the second adopting user attribute value in the search request to generate a second partial score; and aggregating, based on the weight of each of the first user attribute and the second user attribute, the first partial score and the second partial score to generate the matching score.

5. The system of claim 1, the contributing user computer further configured to:

receive, from the contributing user, a second configuration data item of the first type that is used by the configuration engine to further configure the first localized version of the software solution, wherein the first localized version is further accessed by the contributing user computer to perform a second pre-determined task of the contributing user in compliance with the first local requirement of the contributing user;

further receive, from the contributing user, a second contributing user attribute specification from the first plurality of system selected user attributes, wherein the second contributing user attribute specification specifies a third user attribute of the first plurality of system selected user attributes; and generate, in response to the second contributing user attribute specification, a second search tag assigned to the second configuration data item of the first type, wherein the second search tag comprises the third user attribute of the contributing user.

6. The system of claim 1, wherein the configuration engine is further configured to:

receive a third specification of a second type of configuration data items and a fourth specification of a second plurality of system selected user attributes associated with the second type of configuration data items, and wherein the contributing user computer is further configured to:

receive, from the contributing user, a third configuration data item of the second type that is used by the computer server to further configure the first localized version of the software solution, wherein the first localized version is further accessed by the contributing user to perform a third pre-determined task in compliance with the first local requirement of the contributing user;

further receive, from the contributing user, a third contributing user attribute specification from the second plurality of system selected user attributes, wherein the third contributing user attribute specification specifies a fourth user attribute of the second plurality of system selected user attributes; and generate, in response to the third contributing user attribute specification, a third search tag assigned to the third configuration data item of the second type, wherein the third search tag comprises the fourth user attribute of the contributing user.

7. A method to configure a software solution, comprising:

receiving, at a computer server hosting the software solution, a first specification of a first type of configuration data items and a second specification of a first plurality of system selected user attributes associated with the first type of configuration data items;

receiving, from a contributing user, a first configuration data item of the first type that is used by the computer server to configure a first localized version of the software solution, wherein the first localized version is accessed by the contributing user to perform a first pre-determined task in compliance with a first local requirement of the contributing user;

further receiving, from the contributing user, a first contributing user attribute specification that specifies a first user attribute and a second user attribute of the first plurality of system selected user attributes;

generating, in response to receiving the first contributing user attribute specification, a first search tag assigned to the first configuration data item of the first type, wherein the first search tag comprises a first contributing user attribute value of the first user attribute and a second contributing user attribute value of the second user attribute for the contributing user;

receiving, from an adopting user, a search request to search the first type of configuration data items;

selecting, in response to the search request, the first configuration data item of the first type based on the first search tag; and configuring, by the computer server in response to selecting the first configuration data item of the first type, a second localized version of the software solution based on the first configuration data item of the first type, wherein the second localized version is accessed by the adopting user to perform the first pre-determined task in compliance with a second local requirement of the adopting user, wherein the software solution comprises a financial software solution, wherein the first type of configuration data items comprises a category of financial report templates, wherein the first configuration data item of the first type comprises a financial report template of the category, wherein accessing the first localized version by the contributing user to perform the first pre-determined task comprises generating a first financial report of the contributing user based on the financial report template, and wherein accessing the second localized version by the adopting user to perform the first pre-determined task comprises generating a second financial report of the adopting user based on the financial report template.

8. The method of claim 7, wherein the first user attribute comprises a geographical location, wherein the first local requirement is specific to the geographical location of the contributing user, wherein the second user attribute comprises an industry, and wherein the first localized version is accessed by the contributing user to perform the first pre-determined task further in compliance with an industry requirement of the industry of the contributing user.

9. The method of claim 7, further comprising:

storing the first specification in a node of a graph database;

storing the first configuration data item of the first type in a child node of the node in the graph database;

storing each of the first plurality of system selected user attributes in one of a plurality of additional nodes of the graph database, wherein the plurality of additional nodes comprises a first additional node for storing the first user attribute and a second additional node for storing the second user attribute;

storing the first contributing user attribute value of the first user attribute for the contributing user in a first additional child node of the first additional node in the graph database;

store the second contributing user attribute value of the second user attribute for the contributing user in a second additional child node of the second additional node in the graph database;

storing the contributing user attribute specification in a first link and a second link of the graph database, wherein the first link couples the child node and the first additional child node, wherein the second link couples the child node and the second additional child node; and comparing the search request and the first search tag to generate a matching score, wherein selecting, in response to the search request, the first configuration data item of the first type is further based on the matching score meeting a pre-determined criterion.

10. The method of claim 9, further comprising:

further receiving, at the computer server, a weight for each of the first plurality of system selected user attributes, wherein each weight represents a level of relationship between a corresponding system selected user attribute and the first type of configuration data items; and storing each weight in a user attribute link coupling first node and a corresponding one of the plurality of additional nodes in the graph database, wherein the search request comprises a first adopting user attribute value of the first user attribute and a second adopting user attribute value of the second user attribute for the adopting user, and wherein comparing the search request and the first search tag comprises:

traversing, based on the search request, the graph database to:

select the child node from a plurality of child nodes of the node; and further selecting, in response to selecting the child node, the first additional child node and the second additional child node based on the first link and the second link;

retrieving, in response to traversing the graph database, the first search tag from the first additional child node and the second additional child node;

matching the first contributing user attribute value in the first search tag and the first adopting user attribute value in the search request to generate a first partial score;

matching the second contributing user attribute value in the first search tag and the second adopting user attribute value in the search request to generate a second partial score; and aggregating, based on the weight of each of the first user attribute and the second user attribute, the first partial score and the second partial score to generate the matching score.

11. The method of claim 7, further comprising:

receiving, from the contributing user, a second configuration data item of the first type that is used by the computer server to further configure the first localized version of the software solution, wherein the first localized version is further accessed by the contributing user to perform a second pre-determined task in compliance with the first local requirement of the contributing user;

further receiving, from the contributing user, a second contributing user attribute specification from the first plurality of system selected user attributes, wherein the second contributing user attribute specification specifies a third user attribute of the first plurality of system selected user attributes; and generating, in response to the second contributing user attribute specification, a second search tag assigned to the second configuration data item of the first type, wherein the second search tag comprises the third user attribute of the contributing user.

12. The method of claim 7, further comprising:

receiving, at the computer server hosting the software solution, a third specification of a second type of configuration data items and a fourth specification of a second plurality of system selected user attributes associated with the second type of configuration data items;

receiving, from the contributing user, a third configuration data item of the second type that is used by the computer server to further configure the first localized version of the software solution, wherein the first localized version is further accessed by the contributing user to perform a third pre-determined task in compliance with the first local requirement of the contributing user;

further receiving, from the contributing user, a third contributing user attribute specification from the second plurality of system selected user attributes, wherein the third contributing user attribute specification specifies a fourth user attribute of the second plurality of system selected user attributes; and generating, in response to the third contributing user attribute specification, a third search tag assigned to the third configuration data item of the second type, wherein the third search tag comprises the fourth user attribute of the contributing user.

13. A non-transitory computer readable medium storing instructions to configure a software solution, the instructions, when executed by a computer processor, comprising functionality for:

receiving, at a computer server hosting the software solution, a first specification of a first type of configuration data items and a second specification of a first plurality of system selected user attributes associated with the first type of configuration data items;

receiving, from a contributing user, a first configuration data item of the first type that is used by the computer server to configure a first localized version of the software solution, wherein the first localized version is accessed by the contributing user to perform a first pre-determined task in compliance with a first local requirement of the contributing user;

further receiving, from the contributing user, a first contributing user attribute specification that specifies a first user attribute and a second user attribute of the first plurality of system selected user attributes;

generating, in response to receiving the first contributing user attribute specification, a first search tag assigned to the first configuration data item of the first type, wherein the first search tag comprises a first contributing user attribute value of the first user attribute and a second contributing user attribute value of the second user attribute for the contributing user;

receiving, from an adopting user, a search request to search the first type of configuration data items;

selecting, in response to the search request, the first configuration data item of the first type based on the first search tag; and configuring, by the computer server in response to selecting the first configuration data item of the first type, a second localized version of the software solution based on the first configuration data item of the first type, wherein the second localized version is accessed by the adopting user to perform the first pre-determined task in compliance with a second local requirement of the adopting user, wherein the software solution comprises a financial software solution, wherein the first type of configuration data items comprises a category of financial report templates, wherein the first configuration data item of the first type comprises a financial report template of the category, wherein accessing the first localized version by the contributing user to perform the first pre-determined task comprises generating a first financial report of the contributing user based on the financial report template, and wherein accessing the second localized version by the adopting user to perform the first pre-determined task comprises generating a second financial report of the adopting user based on the financial report template.

14. The non-transitory computer readable medium of claim 13, wherein the first user attribute comprises a geographical location, wherein the first local requirement is specific to the geographical location of the contributing user, wherein the second user attribute comprises an industry, and wherein the first localized version is accessed by the contributing user to perform the first pre-determined task further in compliance with an industry requirement of the industry of the contributing user.

15. The non-transitory computer readable medium of claim 13, wherein the instructions, when executed by a computer processor, comprising functionality for:

storing the first specification in a node of a graph database;

storing the first configuration data item of the first type in a child node of the node in the graph database;

storing each of the first plurality of system selected user attributes in one of a plurality of additional nodes of the graph database, wherein the plurality of additional nodes comprises a first additional node for storing the first user attribute and a second additional node for storing the second user attribute;

storing the first contributing user attribute value of the first user attribute for the contributing user in a first additional child node of the first additional node in the graph database;

store the second contributing user attribute value of the second user attribute for the contributing user in a second additional child node of the second additional node in the graph database;

storing the contributing user attribute specification in a first link and a second link of the graph database, wherein the first link couples the child node and the first additional child node, wherein the second link couples the child node and the second additional child node; and comparing the search request and the first search tag to generate a matching score, wherein selecting, in response to the search request, the first configuration data item of the first type is further based on the matching score meeting a pre-determined criterion.

16. The non-transitory computer readable medium of claim 15, wherein the instructions, when executed by a computer processor, comprising functionality for:

further receiving, at the computer server, a weight for each of the first plurality of system selected user attributes, wherein each weight represents a level of relationship between a corresponding system selected user attribute and the first type of configuration data items; and storing each weight in a user attribute link coupling first node and a corresponding one of the plurality of additional nodes in the graph database, wherein the search request comprises a first adopting user attribute value of the first user attribute and a second adopting user attribute value of the second user attribute for the adopting user, and wherein comparing the search request and the first search tag comprises:

traversing, based on the search request, the graph database to:

select the child node from a plurality of child nodes of the node; and further selecting, in response to selecting the child node, the first additional child node and the second additional child node based on the first link and the second link;

retrieving, in response to traversing the graph database, the first search tag from the first additional child node and the second additional child node;

matching the first contributing user attribute value in the first search tag and the first adopting user attribute value in the search request to generate a first partial score;

matching the second contributing user attribute value in the first search tag and the second adopting user attribute value in the search request to generate a second partial score; and aggregating, based on the weight of each of the first user attribute and the second user attribute, the first partial score and the second partial score to generate the matching score.

17. The non-transitory computer readable medium of claim 13, wherein the instructions, when executed by a computer processor, comprising functionality for:

receiving, from the contributing user, a second configuration data item of the first type that is used by the computer server to further configure the first localized version of the software solution, wherein the first localized version is further accessed by the contributing user to perform a second pre-determined task in compliance with the first local requirement of the contributing user;

further receiving, from the contributing user, a second contributing user attribute specification from the first plurality of system selected user attributes, wherein the second contributing user attribute specification specifies a third user attribute of the first plurality of system selected user attributes; and generating, in response to the second contributing user attribute specification, a second search tag assigned to the second configuration data item of the first type, wherein the second search tag comprises the third user attribute of the contributing user.

* * * * *